US010836463B2

(12) United States Patent
Mills et al.

(10) Patent No.: US 10,836,463 B2
(45) Date of Patent: Nov. 17, 2020

(54) AIRCRAFT FLOOR PANEL FLOATING CONNECTION SYSTEM

(71) Applicant: The Boeing Company, Chicago, IL (US)

(72) Inventors: Christopher J. Mills, Charleston, SC (US); Timothy M. Jones, Summerville, SC (US)

(73) Assignee: The Boeing Company, Chicago, IL (US)

( * ) Notice: Subject to any disclaimer, the term of this patent is extended or adjusted under 35 U.S.C. 154(b) by 582 days.

(21) Appl. No.: 15/643,425

(22) Filed: Jul. 6, 2017

(65) Prior Publication Data

US 2019/0009882 A1 Jan. 10, 2019

(51) Int. Cl.
*B64D 11/06* (2006.01)
*B64C 1/20* (2006.01)
*B64C 1/18* (2006.01)

(52) U.S. Cl.
CPC ............... *B64C 1/20* (2013.01); *B64C 1/18* (2013.01); *B64D 11/0696* (2013.01)

(58) Field of Classification Search
CPC .......... B64C 1/20; B64C 1/18; B64D 11/0696
See application file for complete search history.

(56) References Cited

U.S. PATENT DOCUMENTS

| | | | |
|---|---|---|---|
| 2,403,247 A | 7/1946 | Sullivan | |
| 2,607,447 A | 8/1952 | Tuttle | |
| 2,892,376 A | 6/1959 | Schonfeld | |
| 3,922,946 A | 12/1975 | Grayson | |
| 4,399,642 A | 8/1983 | Bard et al. | |
| 4,478,546 A | 10/1984 | Mercer | |
| 4,479,621 A * | 10/1984 | Bergholz | B64C 1/18 244/117 R |
| 4,537,542 A | 8/1985 | Pratt et al. | |
| 4,577,450 A | 3/1986 | Large | |
| 4,934,885 A | 6/1990 | Woods et al. | |

(Continued)

FOREIGN PATENT DOCUMENTS

| | | | |
|---|---|---|---|
| AU | 2003278751 A1 | 5/2004 | |
| CA | 2497054 A1 | 5/2004 | |

(Continued)

OTHER PUBLICATIONS

European Patent Office, Extended European Search Report on European Patent Application No. 18177708.7-1010, dated Oct. 31, 2018, 7 pages.

(Continued)

*Primary Examiner* — Brian M O'Hara
(74) *Attorney, Agent, or Firm* — Kolisch Hartwell, P.C.

(57) ABSTRACT

A floor panel connection system for attaching a floor panel to an aircraft airframe is disclosed. The connection system includes a vertical load resisting coupling device and a shear load resisting coupling device to connect the floor panel to the airframe and resist forces applied to the panel. The vertical load resisting coupling device is configured to resist forces perpendicular to a top facial plane of the floor panel, without significantly resisting lateral forces. The shear load resisting coupling device is configured to resist forces parallel to the top facial plane of the floor panel, without significantly resisting vertical forces.

20 Claims, 9 Drawing Sheets

(56) References Cited

U.S. PATENT DOCUMENTS

| | | | |
|---|---|---|---|
| 4,975,014 A | 12/1990 | Rufin et al. | |
| 5,014,934 A | 5/1991 | McClaflin | |
| 5,090,857 A | 2/1992 | Dunn | |
| 5,164,154 A | 11/1992 | Brown et al. | |
| 5,634,754 A | 6/1997 | Weddendorf | |
| 5,788,443 A | 8/1998 | Cabahug | |
| 6,264,412 B1 | 7/2001 | Nakamura et al. | |
| 6,290,445 B1 | 9/2001 | Duran et al. | |
| 6,474,920 B2 | 11/2002 | Lin | |
| 6,595,734 B2 | 7/2003 | Duran et al. | |
| 7,300,042 B2 | 11/2007 | McClure | |
| 7,338,013 B2 * | 3/2008 | Vetillard | B64C 1/18 244/117 R |
| 7,967,251 B2 * | 6/2011 | Wood | B64C 1/18 244/118.2 |
| 7,988,395 B2 | 8/2011 | Steffier | |
| 8,075,234 B2 | 12/2011 | McClure | |
| 8,342,787 B2 | 1/2013 | Smith | |
| 8,360,362 B2 | 1/2013 | Kismarton et al. | |
| 8,444,359 B2 | 5/2013 | Grether et al. | |
| 9,217,452 B1 | 12/2015 | Woodall, Jr. et al. | |
| 9,586,671 B2 * | 3/2017 | Deloubes | B64C 1/061 |
| 10,457,376 B1 * | 10/2019 | Koman | B64D 11/0696 |
| 2002/0050105 A1 | 5/2002 | McCorkle et al. | |
| 2002/0144574 A1 | 10/2002 | Avetisian et al. | |
| 2005/0200066 A1 | 9/2005 | McClure | |
| 2009/0155014 A1 | 6/2009 | McClure | |
| 2009/0169337 A1 | 7/2009 | LaConte et al. | |
| 2009/0180831 A1 | 7/2009 | Kedall | |
| 2012/0061513 A1 | 3/2012 | Gallant et al. | |
| 2012/0225408 A1 | 9/2012 | Moore | |
| 2012/0230796 A1 | 9/2012 | McClure | |
| 2013/0039716 A1 | 2/2013 | McClure | |
| 2013/0084130 A1 | 4/2013 | McClure | |
| 2013/0092793 A1 | 4/2013 | Braeutigam | |
| 2013/0094921 A1 | 4/2013 | McClure | |
| 2014/0086704 A1 | 3/2014 | Hemingway et al. | |
| 2018/0327074 A1 * | 11/2018 | Mills | B64C 1/18 |
| 2019/0162225 A1 | 5/2019 | Etling et al. | |

FOREIGN PATENT DOCUMENTS

| | | |
|---|---|---|
| CA | 2758594 A1 | 11/2010 |
| CA | 2755256 A1 | 3/2011 |
| CA | 2497054 C | 6/2011 |
| CA | 2476093 C | 5/2012 |
| CA | 2937937 A1 | 9/2015 |
| CN | 102171462 A | 8/2011 |
| CN | 102197231 A | 9/2011 |
| CN | 102439321 A | 5/2012 |
| CN | 102459927 A | 5/2012 |
| CN | 102171462 B | 12/2014 |
| CN | 102439321 B | 5/2015 |
| CN | 102459927 B | 5/2015 |
| EP | 1549457 A1 | 7/2005 |
| EP | 1562261 A2 | 8/2005 |
| EP | 1549457 A4 | 7/2010 |
| EP | 2324256 A2 | 5/2011 |
| EP | 2329156 A2 | 6/2011 |
| EP | 2406506 A1 | 1/2012 |
| EP | 2419649 A2 | 2/2012 |
| EP | 2406506 A4 | 10/2012 |
| EP | 2329156 A4 | 3/2013 |
| EP | 2419649 A4 | 5/2013 |
| EP | 2275692 B1 | 3/2014 |
| EP | 2733061 A1 | 5/2014 |
| EP | 1549457 B1 | 7/2014 |
| EP | 2419649 B1 | 9/2014 |
| EP | 3108148 A1 | 12/2016 |
| EP | 2406506 B1 | 1/2017 |
| FR | 2755483 B1 | 4/2004 |
| FR | 3025178 A1 | 3/2016 |
| JP | H06298186 A | 10/1994 |
| JP | 2015-96770 A | 5/2015 |
| RU | 2440278 C1 | 1/2012 |
| WO | 2004037483 A1 | 5/2004 |
| WO | 2010027439 A2 | 3/2010 |
| WO | 2010027439 A3 | 3/2010 |
| WO | 2010033149 A2 | 3/2010 |
| WO | 2010033149 A3 | 3/2010 |
| WO | 2010134946 A2 | 11/2010 |
| WO | 2010134946 A3 | 11/2010 |
| WO | 2011031283 A2 | 3/2011 |
| WO | 2013120156 A1 | 8/2013 |
| WO | 2015130533 A1 | 9/2015 |

OTHER PUBLICATIONS

U.S. Appl. No. 30/357,292, filed Feb. 15, 2002 by Travis McClure, 7 pages.
Goodrich Interiors, Installation Instructions and Limitations for Model 2787 Track-Mounted Cabin Attendant Seat for Boeing 787 Aircraft, Dec. 9, 2008, 8 pages.
Avibank, New Product Bulletin for E-Nut Fastening System, Jan. 23, 2009, 5 pages.
European Patent Office, Examination Report regarding European Patent Application No. 18 177 708.7-1010, dated Sep. 16, 2019, 4 pages.
U.S. Patent and Trademark Office, Non-Final Office Action regarding U.S. Appl. No. 15/595,804, dated Mar. 3, 2020, 33 pages.
U.S. Patent and Trademark Office, Non-Final Office Action regarding U.S. Appl. No. 15/595,923, dated Nov. 6, 2019, 30 pages.

* cited by examiner

AIRCRAFT FLOOR PANEL FLOATING CONNECTION SYSTEM

FIELD

This disclosure relates to fasteners. More specifically, the disclosed embodiments relate to systems and methods for fastening floor panels to an aircraft floor support structure.

INTRODUCTION

Airplane floors typically consist of honeycomb sandwich floor panels fastened to floor structures referred to as seat tracks. During operation of an airplane, the floor panels accommodate a variety of forces, or loads. These include both vertical loads from sources such as air pressure differences or people walking on the floor, and shear loads from sources such as attached seats undergoing acceleration and deceleration of the plane. One function of floor panels is to transfer these loads into the body of the airplane.

In some areas of the airplane, for example the wing box, the floor structure flexes during operation. The floor panels move relative to the seat tracks, necessitating a connection system that allows movement in some directions while accommodating loads in other directions. Connectors that allow a limited range of motion in one or more directions are called 'floating' connectors.

A floating connection system typical of current technology includes an inner sleeve insert, an outer sleeve insert, and a fastener with a collet and screw. The inner sleeve insert is contained in the outer sleeve insert such that the two inserts slide relative to one another in only two opposed directions. The outer sleeve insert is in turn secured in an aperture of a floor panel. The collet and screw are inserted through the two inserts, and the screw is used to radially expand multiple fingers of the collet such that the fingers engage an underside of the seat track.

Using such current technology, each fastener is configured to resist both vertical and shear loads. Shear loads on an airplane floor are generally more significant than vertical loads, which results in a higher overall capacity for vertical loads than is needed.

SUMMARY

A floor panel connection system for attaching a floor panel to an airframe is disclosed. The connection system includes a vertical load resisting coupling device and a shear load resisting coupling device to connect the floor panel to the airframe and resist forces applied between the panel and the airframe.

The floor panel has an edge region overlapping a lateral edge portion of the airframe, and the edge region has a plurality of holes. The vertical load resisting coupling device and the shear load resisting coupling device are each received in one or more of the plurality of holes.

The vertical load resisting coupling device is configured to resist forces perpendicular to a top facial plane of the floor panel, without significantly resisting lateral forces. The vertical load resisting coupling device prevents the floor panel moving relative to the airframe when forces are applied perpendicular to a top plane of the floor panel. However, the vertical load resisting coupling device allows the floor panel to move relative to the airframe when lateral forces are applied to the floor panel.

The shear load resisting coupling device is configured to resist forces parallel to the top facial plane of the floor panel, without significantly resisting vertical forces. The shear load resisting coupling device prevents the floor panel moving relative to the airframe when forces are applied parallel to a top plane of the floor panel.

The present disclosure provides a floor panel connection system. In some embodiments, a floor panel connection system may include vertical load resisting coupling devices and shear load resisting coupling devices. In some embodiments, a shear load resisting coupling device may include a base and a connector. In some embodiments, a shear load resisting coupling device may include a first arm and a pivotably coupled second arm. In some embodiments, a vertical load resisting coupling device may include an insert configured to be received in a non-circular hole. In some embodiments, a vertical load resisting coupling device may include an insert with an elongate opening. In some embodiments, a vertical load resisting coupling device may include a base and a connector with a protruding element.

Features, functions, and advantages may be achieved independently in various embodiments of the present disclosure, or may be combined in yet other embodiments, further details of which can be seen with reference to the following description and drawings.

DESCRIPTION

Overview

Various embodiments of a floor connection system having vertical load connectors and shear load connectors are described below and illustrated in the associated drawings. Unless otherwise specified, the floor connection system and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other connection systems. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

Figure 1:
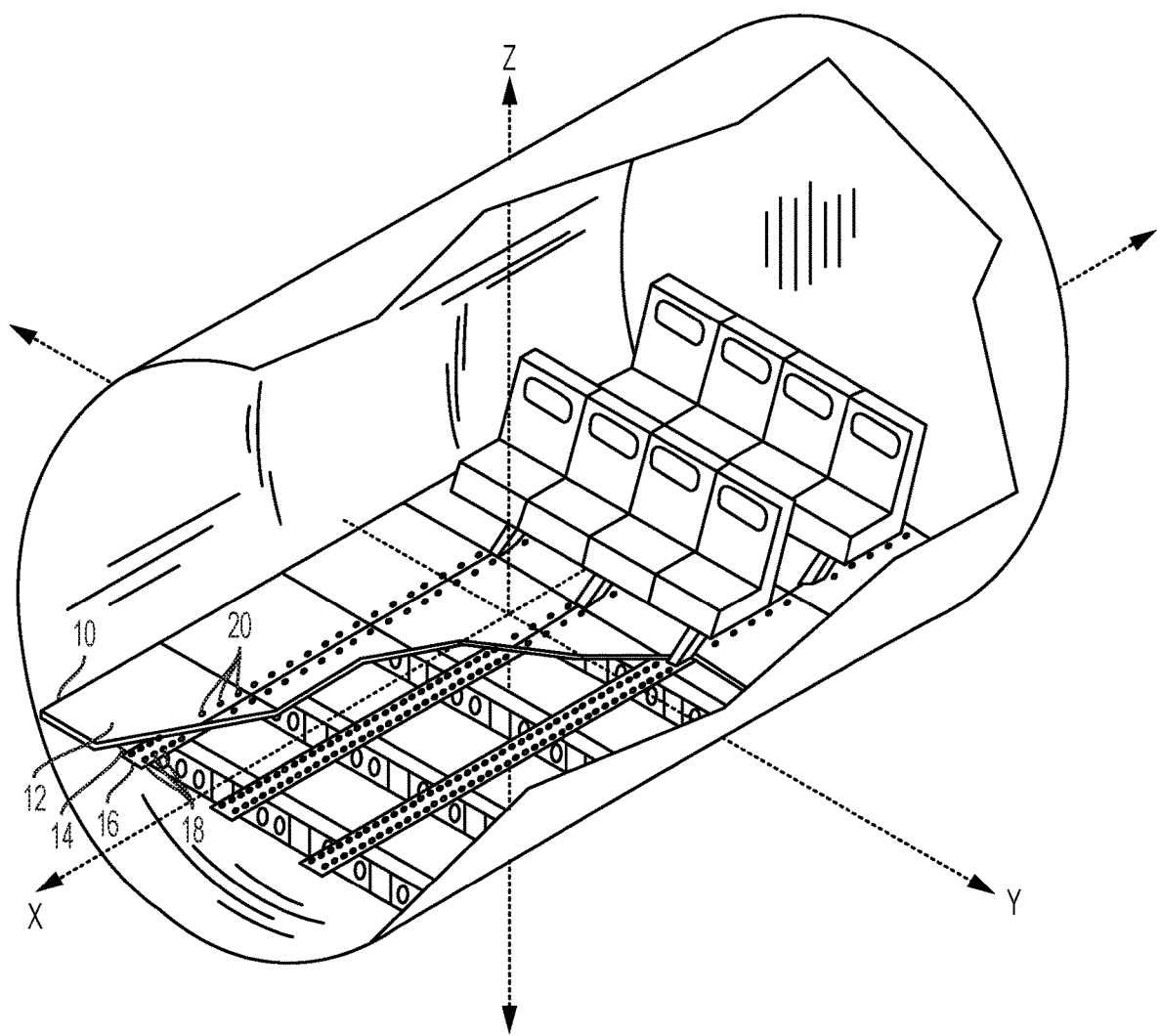
FIG. 1 is a partial, cut-away isometric view of an illustrative airplane cabin.

FIG. 1 shows an illustrative airplane cabin, with seats mounted on a floor of multiple assembled floor panels. Below the floor panels, multiple seat tracks extend longitudinally through the cabin, and each floor panel spans from one seat track to an adjacent seat track. In other areas of the airplane, different airframe components may support the assembled floor panels. Disclosed floor panel connection systems may be used to connect aircraft floor panels to any airframe component that has appropriately dimensioned, and spaced, arrays of holes or apertures in one or more lateral edge regions. An airframe component may take the form of a floor panel support structure, for example, a seat track.

Referring again to FIG. 1, directions perpendicular to the cabin floor may be referred to as "along the z-axis," "vertical," or "up and down." Directions parallel to the cabin floor and perpendicular to the longitudinal extent of the seat tracks may be referred to as "along the "y-axis", "lateral," or "inboard and outboard." Directions parallel to the cabin floor and parallel to the longitudinal extent of the seat tracks may be referred to as "along the "x-axis", "longitudinal," or "forward and reverse."

A floor panel 10 includes an edge region 12 that overlaps a lateral edge portion 14 of a seat track 16. A plurality of seat track apertures 18 are formed along lateral edge portion 14, and a plurality of floor panel apertures 20 are formed along edge region 12. Floor panel apertures 20 correspond to some or all of seat track apertures 18, and floor panel 10 is disposed on seat track 16 such that corresponding apertures are aligned.

In some examples, the plurality of floor panel apertures 20 may include some apertures that do not correspond to any seat track apertures. Also, some corresponding apertures may be offset by a certain distance, rather than aligned. Some apertures of the plurality of apertures 20 may extend entirely through the floor panel, while other apertures may extend only partially through the floor panel.

A plurality of coupling devices extending into or through the corresponding apertures connect floor panel 10 to seat track 16. The coupling devices include vertical load resisting coupling devices that resist vertical loads without significantly resisting shear loads, and shear load resisting coupling devices that resist shear loads without significantly resisting vertical loads. The coupling devices may be referred to as "connectors," "vertical load connectors," or "shear load connectors." "Vertical loads" are defined as "forces applied to floor panel 10 in a direction perpendicular to the cabin floor" and "shear loads" are defined as "forces applied to the panel in a direction parallel to the cabin floor."

During operation of the airplane, flexing of the airframe may require floor panel 10 to move relative to seat track 16. Each connector therefore allows a limited range of motion between the floor panel and the seat track in two opposed directions along some axis. The limited range of motion may be referred to as 'float'. A preferred float for a connector may be 0.125 inches, may be between 0.1 inches and 0.2 inches, or may be less than 0.25 inches.

Along each axis, a connector connecting floor panel 10 and seat track 16 may either accommodate loads, have float, or not significantly resist loads. If the connector accommodates loads, then it prevents relative movement between floor panel 10 and seat track 16, and transfers force from one to the other. If the connector has float, then the connector does not significantly resist loads within a predetermined range of motion.

A vertical load connector accommodates loads along the z-axis and may have float along either the x-axis, the y-axis, or both. A shear load connector does not significantly resist loads along the z-axis and either accommodates loads along the x-axis and has float along the y-axis, or accommodates loads along the y-axis and has float along the x-axis.

During operation, floor panel 10 may experience a range of load strengths. Vertical loads may be greatest under explosive decompression, and shear loads may range up to as much as a 9G force under adverse conditions. Each connector is appropriately manufactured of a sufficiently strong material to withstand such loads, e.g. metals, plastics, or the like.

Each connector also includes an insert, which extends into or through a hole or aperture of the plurality of floor panel apertures 20. In some examples, the insert may also extend through an aperture of the plurality of seat track apertures 18. In other examples, the insert may be configured to receive a fastener, and the fastener may extend through an aperture of the plurality of seat track apertures 18.

Floor panel 10 may be connected to seat track 16 by one example of a vertical load connector and one example of a shear load connector. Alternatively, floor panel 10 may be connected to seat track 16 by any appropriate combination of examples of vertical and shear load connectors. In order for floor panel 10 to move relative to seat track 16, connectors may be used that all have float in the same direction.

EXAMPLES, COMPONENTS, AND ALTERNATIVES

The following sections describe selected aspects of exemplary floor panel connection systems as well as related systems and/or methods. The examples in these sections are intended for illustration and should not be interpreted as limiting the entire scope of the present disclosure. Each section may include one or more distinct inventions, and/or contextual or related information, function, and/or structure.

Example 1

Figure 2:
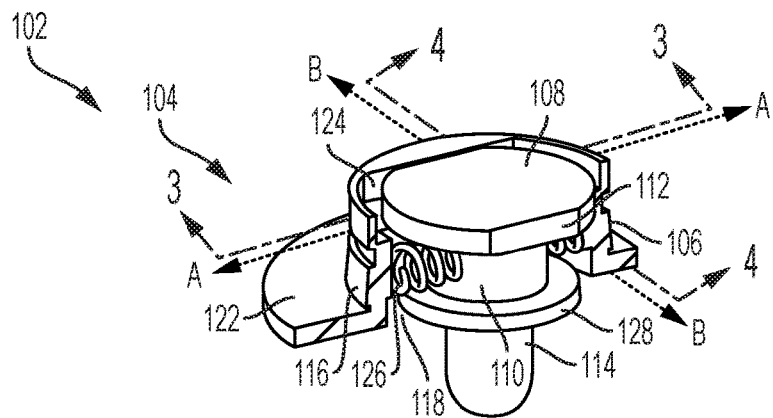
FIG. 2 is a cut-away isometric view of an exemplary shear load connector.
Figure 3:
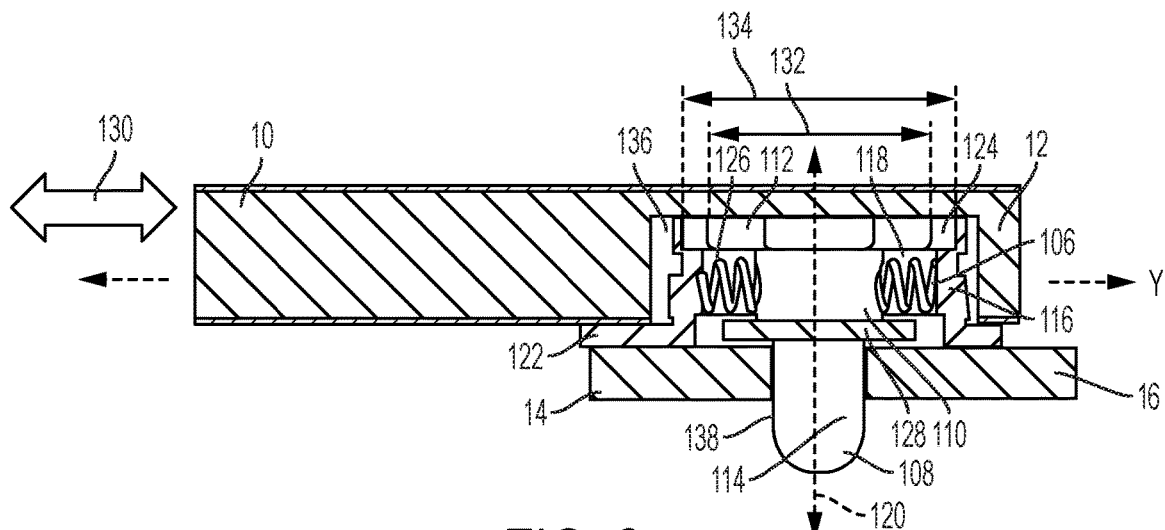
FIG. 3 is a cross-sectional view along lines 3-3 in FIG. 2 of the coupling device of FIG. 2 connecting a floor panel and a seat track.
Figure 4:
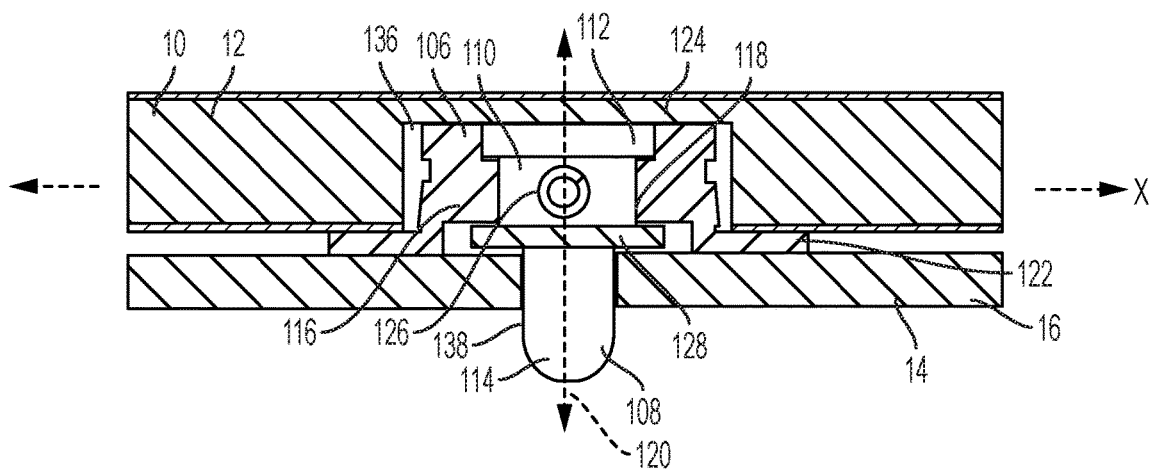
FIG. 4 is a cross-sectional view along lines 4-4 in FIG. 2 of the connector of FIG. 2 connecting a floor panel and a seat track.

FIGS. 2-4 show an example of a shear load connector generally indicated at 102, including an insert 104 that has a base 106 and a pin 108. FIG. 2 shows a cut-away isometric view of connector 102 which accommodates loads parallel to line BB and has float parallel to line AA, where lines AA and BB are perpendicular. Base 106 is configured to closely conform to pin 108 on two opposing sides, and otherwise be spaced from the pin. Pin 108 may therefore slide in base 106 in both directions parallel to line AA, but the base prevents the pin from moving in either direction parallel to line BB.

Pin 108 has a body 110, a flanged head 112, and a shaft 114 with a rounded blunt end. Base 106 includes a collar 116 defining a passage 118 with a central axis 120. A flange 122 is formed on collar 116 at a lower end of passage 118.

Pin 108 extends through passage 118, with flanged head 112 and body 110 contained within the passage. Passage 118 increases in radius at an upper end, to form a cavity 124 that accommodates flanged head 112. Both flanged head 112 and cavity 124 are generally circular in shape, with two oppositely facing flat edges and two curved edges. Cavity 124 conforms closely to flanged head 112 along the two flat edges, and an inner surface of the cavity contacts the flanged head along the two flat edges. However, the inner surface of cavity 124 is spaced from flanged head 112 along the two curved edges.

In the pictured example, passage 118 extends entirely through base 106 and flanged head 112 of pin 108 is flush with a top surface of collar 116. In other examples, passage 118 may not extend only partly through base 106, or collar 116 may include a lip formed on the top surface extending over flanged head 112. Any appropriate structure may be included on collar 116, provided that movement of pin 108 is not impeded along the y-axis.

Referring again to FIG. 2, passage 118 similarly conforms closely to a first two opposite edges of body 110 of pin 108 and is spaced from a second two opposite edges of the body. Two coiled springs 126 attach to the second two opposite edges of body 110 and to an inside surface of passage 118. Body 110 of pin 108 is disposed between the springs. Springs 126 urge pin 108 into alignment with central axis 120, which may be referred to as a "nominal position" of insert 104. If no force is applied to pin 108 parallel to line AA and relative to base 106, the pin will therefore return to alignment.

Other mechanisms or bias elements may be used to urge pin 108 to return to the nominal position when displaced. In some examples, springs may be connected to flanged head 112 and an inner surface of cavity 124. In other examples, passage 118 may be lined with a compressible material.

As shown in FIG. 2, passage 118 also increases in radius at a lower end, to form a recess to accommodate a washer 128. Shaft 114 of pin 108 extends through the washer, which may be coupled to the shaft and may not contact base 106. The washer may be disposed at a base of shaft 114, where the shaft is formed on body 110 of pin 108. Body 110 may therefore prevent washer 128 from moving up the pin.

Pin 108 is retained in base 106 by flanged head 112 in one direction and washer 128 in the opposite direction. In other examples, other structures on base 106 or pin 108 may retain the pin in the base. For example, collar 116 may include a lip formed on the top surface that retains a top side of flanged head 112 of pin 108, and an intrusion or bump may be formed on the inner surface of passage 118 that retains a bottom side of flanged head 112. The pin may be retained in any appropriate manner, provided that movement of the pin is not impeded along the y-axis.

FIG. 3 is a cross-sectional view along lines 3-3 in FIG. 2 of insert 104 connecting floor panel 10 and seat track 16. When insert 104 is installed in floor panel 10, line AA and line BB are in the plane of the floor panel, with line AA parallel to the y-axis and line BB parallel to the x-axis. Insert 104 allows floor panel 10 to move in the directions indicated by arrow 130, along the y-axis. The allowed range of motion or float is determined by the difference between length 132 of flanged head 112 and length 134 of cavity 124. For example, in a case where length 134 is about 0.25 inches greater than length 132, floor panel 10 may float about 0.125 inches. In examples with different geometries, the float may be determined by other lengths.

Insert 104 is disposed between edge region 12 of floor panel 10 and lateral edge portion 14 of seat track 16. Collar 116 of base 106 extends into a floor panel aperture 136, and flange 122 contacts a bottom surface of floor panel 10. Flange 122 also contacts an upper surface of seat track 16 and shaft 114 of pin 108 extends through a seat track aperture 138. Washer 128 may lie flush with flange 122 and contact seat track 16.

Floor panel aperture 136 is round, and extends only partly through floor panel 10. Aperture 136 is of sufficient size to receive collar 116, and allow flange 122 to lie flush on the bottom surface of floor panel 10. In some examples, aperture 136 may have other shapes, or may extend fully through the floor panel. Any effective aperture may be used.

Flange 122 is asymmetrical, as shown in FIG. 3. Generally circular in shape, the flange has a flattened edge to allow insert 104 to be installed proximate an outer edge of edge region 12 without extending beyond floor panel 10. Collar 116 is symmetrically spaced from flanged head 112, body 110, and shaft 114 of pin 108 in the pictured plane.

FIG. 4 is a cross-sectional view along lines 4-4 in FIG. 2 of insert 104 connecting floor panel 10 and seat track 16. Collar 116 conforms closely to flanged head 112 and body 110, but is spaced from shaft 114 of pin 108 in the pictured plane. Pin 108 is prevented from moving along the x-axis by the contact between flanged head 112 and base 106. Collar 116 contacts flanged head 112 along both of the two oppositely facing flat edges of the flanged head, preventing pin 108 from moving in either direction along the x-axis. That is, the pin is trapped on two sides by collar 116, and thereby accommodates loads along the x-axis. In some examples body 110 may also contact collar 116 and prevent motion of pin 108 relative to base 106.

Flange 122 is bonded to the bottom surface of floor panel 10, retaining collar 116 in floor panel aperture 136 and allowing floor panel 10 and insert 104 to be manipulated as a unit. In other examples, other portions of base 106 may be bonded to floor panel 10. For example, a top surface of collar 116 may be bonded to a flat upper surface of aperture 136. For another example, collar 116 may be bonded to a curved interior surface of aperture 136. Insert 104 may be bonded to floor panel 10 at the time of floor installation, or floor panel 10 may be provided with insert 104 previously bonded.

Aside from minimal frictional resistance from interaction of pin 108 with seat track aperture 138, insert 104 allows floor panel 10 to be freely lifted or lowered into place. During installation or replacement, an installer may lift a combination of floor panel 10 and insert 104 clear of seat track 16 without needing the aid of a tool or other device.

The rounded blunt end of pin 108 may aid installation by redirecting downward forces to center the pin in seat track aperture 138, when placement is not exact. Springs 126 may also aid installation by keeping pin 108 in the nominal position aligned with central axis 120. In a case where multiple inserts 104 are installed in floor panel 10, keeping pins 108 in the nominal position may preserve a desired spacing between pins, such that the multiple pins may be aligned with multiple seat track apertures.

Example 2

Figure 5:
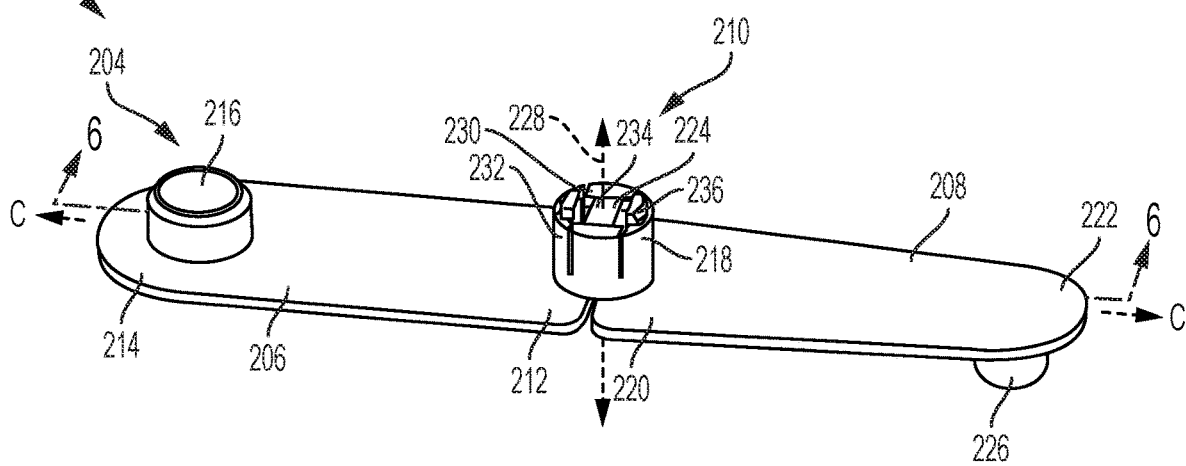
FIG. 5 is an isometric view of another exemplary shear load connector.
Figure 6:
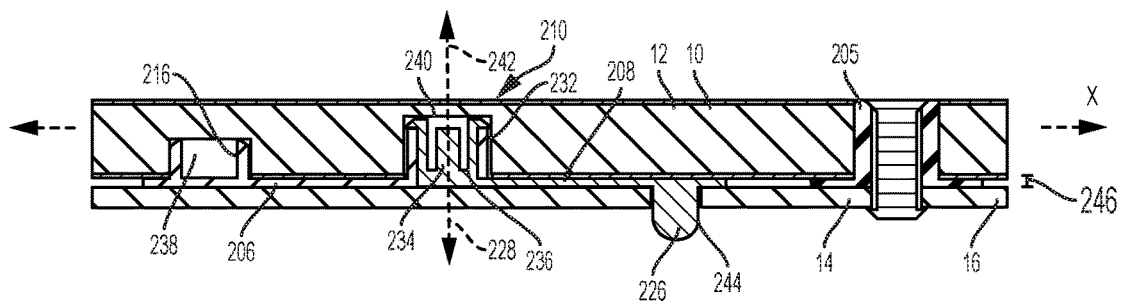
FIG. 6 is a schematic representation of a cross-sectional view along lines 6-6 in FIG. 5 of the connector of FIG. 5.

FIGS. 5-6 show another example of a shear load connector 202 including an insert generally indicated at 204, that has a first fixed arm 206 and a second free arm 208. FIG. 5 shows an isometric view of connector 202 which accommodates loads parallel to line CC and has float perpendicular to the line, where line CC is parallel to a longitudinal extent of fixed arm 206. Free arm 208 is configured to turn about a pivot connection 210 with fixed arm 206. A sufficiently small turn approximates movement of a distal end of free arm 208 in a direction perpendicular to line CC.

Fixed arm 206 is planar, with an elongate rectangular shape that is generally rectangular at a connecting end 212 and rounded at a distal end 214. A boss 216 is formed on an upper surface near distal end 214, and a collar 218 is formed on the upper surface at connecting end 212. Collar 218 extends out beyond fixed arm 206.

In the pictured example, boss 216 is cylindrical and hollow. In other examples, boss 216 may have a rounded or a flat top surface, may be of any appropriate shape, and may be hollow, solid, or filled with a light reinforcing material. Boss 216 may be disposed anywhere on the upper surface of fixed arm 206.

As shown in FIG. 5, free arm 208 is also planar, with an elongate triangular shape that is also generally rectangular at a connecting end 220 and rounded at a distal end 222. A prong 224 is formed at connecting end 220, extending upward, and a pin 226 is formed on an underside of the free arm near distal end 222, extending downward. Pin 226 has a rounded blunt end, and may be hollow, solid, or filled with a light reinforcing material. Any protruding element configured to engage seat track 16 may be used in place of pin 226, for example a bolt, peg, or stud.

Connecting ends 212 and 220 are disposed proximate one another, with prong 224 extending up through collar 218. Connecting end 212 of fixed arm 206 includes a concavity to accommodate prong 224. Together prong 224 and collar 218 form pivot 210, which defines a pivot axis 228. In other examples, pivot 210 may be formed by other mechanisms. Any structure providing an effective pivot may be used.

In the pictured embodiment, collar 218 is divided into two opposing fingers 230 with tabs extending in toward pivot axis 228, and a further two opposing fingers 232 with a flat upper surface. Prong 224 includes a central column 234 disposed between two fingers 236 with tabs extending out away from pivot axis 228. Central column 234 has two shoulders, to receive the tabs of collar fingers 230. The tabs of prong fingers 236 rest on collar fingers 232. Prong 224 is thereby retained in collar 218.

The geometry of the connection also serves to bias free arm 208 to return to a nominal position in alignment with line CC. When free arm 208 is turned about the pivot, collar fingers 230, 232 engage prong 224 and urge the arm back into alignment. In other examples, other mechanisms or structures may be used to bias free arm 208.

Free arm 208 may turn about pivot 210 until limited by the pivot or by fixed arm 206. For example, connecting end 220 may be brought into contact with connecting end 222 of fixed arm 206, preventing further pivot and restricting the range of motion. Alternatively, the engagement between fingers 230, 232 and prong 224 may limit the angle to which free arm 208 may pivot. Any appropriate range of motion may be allowed. For example, if the range of motion is an angle measured between a first line defined by a longitudinal extent of fixed arm 206 and second line defined by a longitudinal extent of free arm 208, then the free arm may be able to pivot a maximum of 5 degrees in either direction.

FIG. 6 is a cross-sectional view along lines 6-6 in FIG. 5 of insert 204 connecting floor panel 10 and seat track 16. Insert 104 is disposed between edge region 12 of floor panel 10 and lateral edge portion 14 of seat track 16.

Floor panel 10 has two apertures 238, 240, where aperture 240 defines a vertical axis 242. Boss 216 is received in aperture 238 and pivot connection 210 is received in aperture 240, such that pivot axis 228 is parallel to vertical axis 242. Fixed arm 206 and free arm 208 are sandwiched between floor panel 10 and seat track 16, in contact with a bottom surface of floor panel 10 and an upper surface of seat track 16. Pin 226 extends through an aperture 244 of seat track 16.

Fixed arm 206 is bonded to an underside of floor panel 10, retaining boss 216 in floor panel aperture 238 and allowing floor panel 10 and insert 204 to be manipulated as a unit. In other examples, other portions of fixed arm 206 or boss 216 may be bonded to floor panel 10. For example, boss 216 may be bonded to an interior surface of aperture 238. Insert 204 may be bonded to floor panel 10 at the time of floor installation, or floor panel 10 may be provided with insert 204 previously bonded.

Aside from minimal frictional resistance from interaction of pin 226 with seat track aperture 240, insert 204 allows floor panel 10 to be freely lifted or lowered into place. During installation or replacement, an installer may lift a combination of floor panel 10 and insert 204 clear of seat track 16 without needing the aid of a tool or other device.

The rounded blunt end of pin 226 may aid installation by redirecting downward forces to center the pin in seat track aperture 240, when placement is not exact. Pivot 210 may also aid installation by keeping free arm 208 in the nominal position, aligned with fixed arm 206. In FIG. 6, free arm 208 is shown in the nominal position. In the nominal position, pin 226 extends into aperture 244 when boss 216 extends into aperture 238, and when edge region 12 and lateral edge portion 14 are overlapped.

As shown in FIG. 6, when another connector 205 is disposed between edge region 12 and edge portion 14, a gap is formed between floor panel 10 and seat track 16. Fixed arm 206 and free arm 208 share a thickness 246, which may be equal to a height of the gap. That is, a gap formed between floor panel 10 and seat track 16 by insert 204 may be the same as the gap formed between the floor panel and seat track by connector 205. Connector 205 may be a vertical load connector, a shear load connector, or any kind of connector used to connect floor panel 10 to seat track 16.

Figure 7:
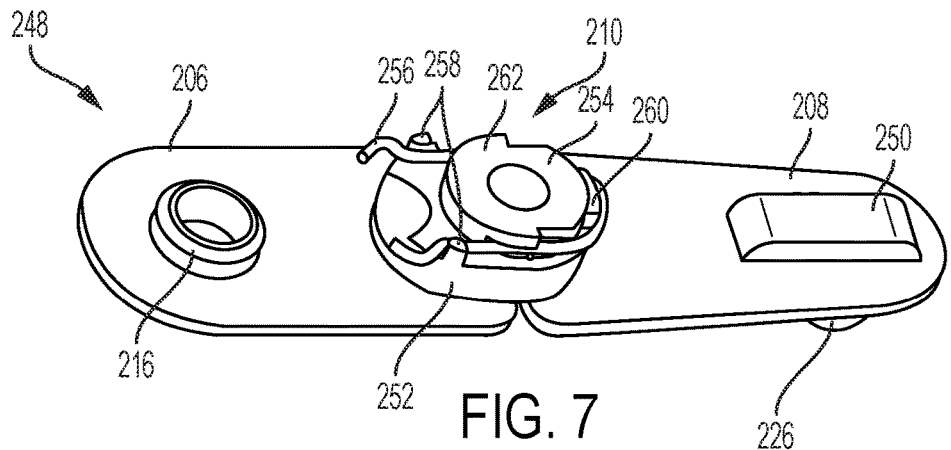
FIG. 7 is an isometric view of another exemplary shear load connector.

FIG. 7 shows an alternative embodiment of insert 204, generally indicated at 248. For clarity, parts in common with the previously described embodiment are indicated with the same reference numbers. Insert 248 also includes a fixed arm 206, a free arm 208, a boss 216, and a pin 226.

A stiffener 250 is formed on an upper surface of free arm 208. An additional aperture may be formed in edge region 12 of floor panel 10 to receive the stiffener. In order to allow movement of free arm 208 relative to the floor panel, the additional aperture may be larger than stiffener 250. The stiffener may be any appropriate shape, and may be disposed anywhere on the upper surface of free arm 208.

As shown in FIG. 7, a collar 252 is formed on an upper surface of fixed arm 206 and an annular column 254 is formed at an end of free arm 208. Together the collar and column make a pivot connection 210. A spring clip 256 is disposed around column 254, at a top end of collar 252. Two protrusions 258 on the top end of collar 252 hold spring clip 256 under tension, and a tab 260 on the collar spaces the spring clip from column 254. The column includes two tabs 262 at a top end, which are disposed above and retain spring clip 256. Rotation of free arm 208 puts additional tension on spring clip 256, which serves to bias the free arm to return to a nominal position in alignment with fixed arm 206.

Fixed arm 206 and free arm 208 share a thickness, which may correspond to a dimension of another connector. For example, the thickness may equal a thickness of a flange of a vertical load connector. That is, a vertical load connector, or any other type of connector, may cause a first gap between floor panel 10 and seat track 16 when connecting the floor panel and seat track. Insert 248 may cause a second gap between floor panel 10 and seat track 16 when connecting the floor panel and seat track, and the first and second gaps may be of equal height.

Figure 8:
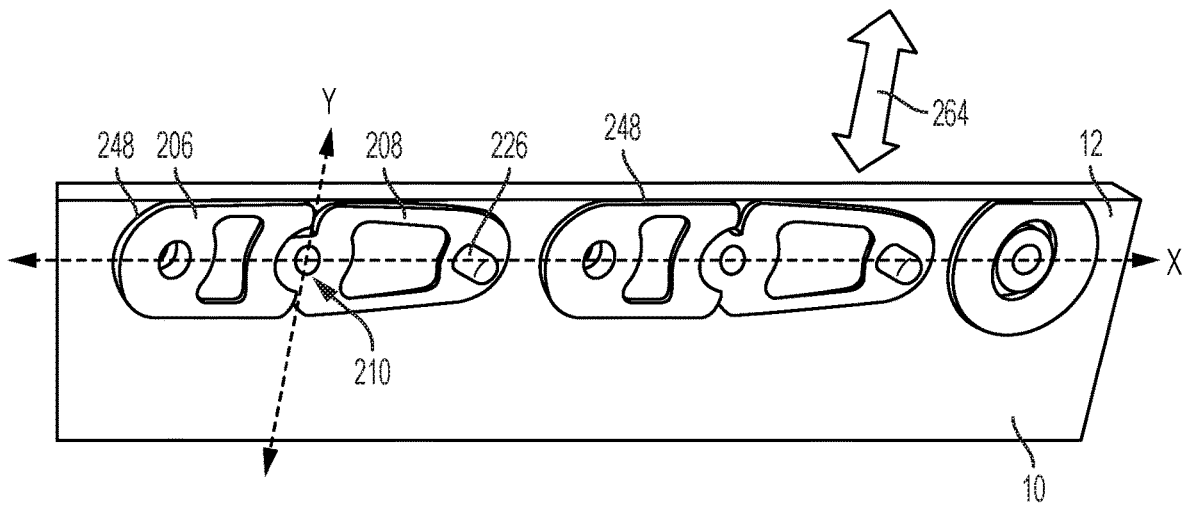
FIG. 8 is an isometric view of two of the connectors of FIG. 7, installed in a floor panel.

FIG. 8 shows two inserts 248 installed in floor panel 10, parallel to the x-axis. When floor panel 10 is overlapped with seat track 16 and inserts 248 are installed in seat track 16, the inserts allow the floor panel to move in the directions indicated by arrow 264, along the y-axis. A pivot of free arm 208 about pivot connection 210 is translated into movement of floor panel 10 along the y-axis. The allowed range of motion or float is determined roughly by the product of a length of the free arm and the angle of pivot, where the angle of pivot is measured between a first line defined by a longitudinal extent of fixed arm 206 and second line defined by a longitudinal extent of free arm 208 For example, in a case where pin 226 is about 1.43 inches from pivot axis 228 and free arm 208 is restricted to a maximum pivot angle of about 5 degrees in either direction, floor panel 10 may float about 0.125 inches.

Example 3

Figure 9:
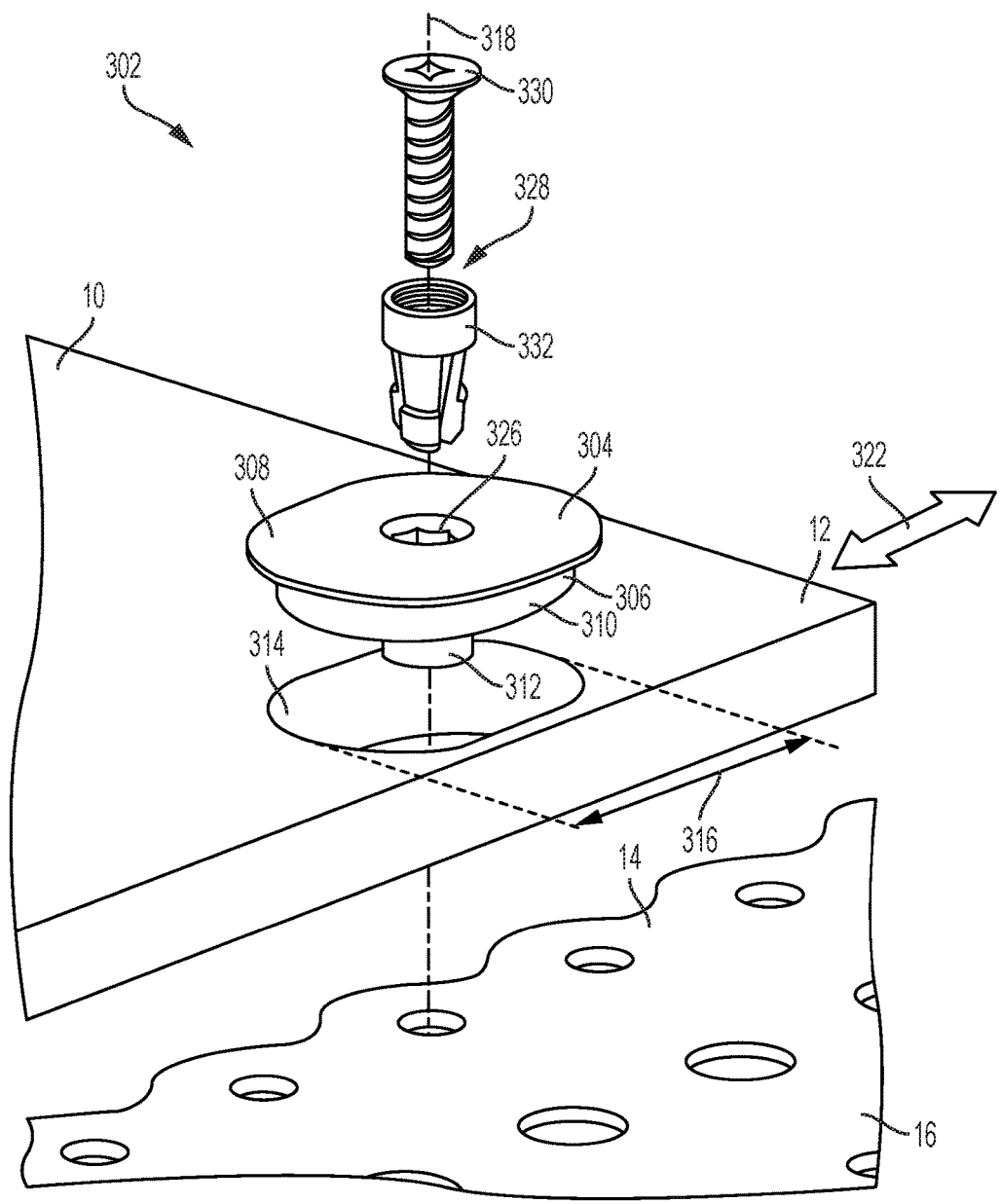
FIG. 9 is an exploded isometric view of an exemplary vertical load connector, a floor panel, and a seat track.
Figure 10:
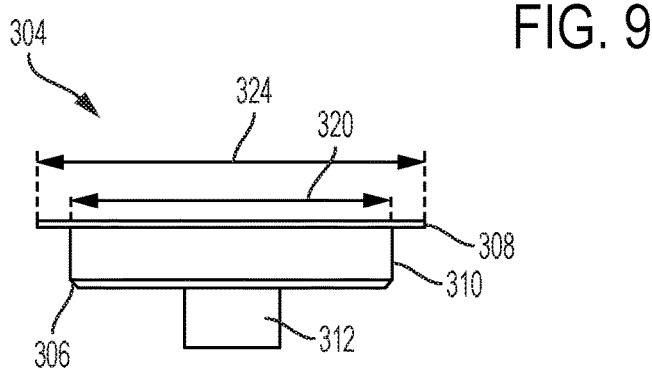
FIG. 10 is a side view of the insert of FIG. 9.
Figure 11:
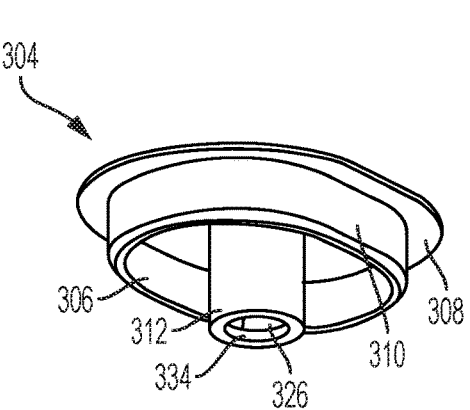
FIG. 11 is an isometric view of the insert of FIG. 9.

FIGS. 9-11 show an example of a vertical load connector generally indicated at 302, which includes a non-circular insert 304 that has a base 306 and a flange 308. FIG. 9 is an exploded isometric view of connector 302 connecting floor panel 10 and seat track 16. Connector 302 accommodates loads both perpendicular to the plane of floor panel 10, along the z-axis, and in the plane of floor panel 10, along the y-axis. Connector 302 has float in the plane of floor panel 10, along the x-axis.

Base 306 of the connector includes an outer collar 310 and an inner collar 312, and is sized to be entirely received in a non-circular aperture 314 in edge region 12 of floor panel 10. Aperture 314 has a width 316 as measured along the x-axis, and a vertical axis 318 parallel to the z-axis. Outer collar 310 has a non-circular shape corresponding to aperture 314, and similarly has a width 320, shown in FIG. 10.

Collar width 320 is less than aperture width 316, so that when base 306 is received in aperture 314 as indicated in FIG. 9, insert 304 may move along the x-axis relative to floor panel 10. That is, aperture 314 is sized to allow insert 304 to move in two opposed directions in the plane of floor panel 10. To put it another way, insert 304 allows floor panel 10 to move in the directions indicated by arrow 322, along the x-axis.

The allowed range of motion or float is determined by the difference between collar width 320 and aperture width 316. For example, in a case where the aperture width is 0.25 inches greater than the collar width, floor panel 10 may float about 0.125 inches.

In contrast, outer collar 310 conforms to aperture 314 along the y-axis. Insert 304 and floor panel 10 may not move relative to one another, and therefore connector 302 accommodates loads along the y-axis. The non-circular shape of the insert and the aperture in addition to contact between a portion of the insert and an inner surface of the aperture, prevent rotation of insert 304 about vertical axis 318.

Flange 308 also has a matching non-circular shape, with a width 324 shown in FIG. 10. Flange width 324 is greater than both collar width 320 and aperture width 316. The flange width is sufficient that when base 306 is received in aperture 314 as indicated in FIG. 9, flange 308 covers the aperture even when base 306 is not centered in the aperture.

Flange 308 may have a thickness of about 0.02 inches, or may have any thickness suitable to limit interaction with floor coverings such as carpet, or noticeability by persons walking on floor panel 10. Flange 308 contacts an upper surface of edge region 12 of floor panel 10, and lies flat against the floor panel. The flange may prevent insert 304 passing through aperture 314 when base 306 is received by the aperture.

Inner collar 312 defines an opening 326 sized to receive a fastener 328. In the example pictured in FIG. 9, the fastener includes a screw 330 and a collet 332. Fastener 328 resists loads in the vertical direction by engaging a head of screw 330 with insert 304 and engaging multiple fingers of collet 332 with an underside of seat track 16. Flange 308 in turn engages floor panel 10, thereby holding the floor panel to the seat track, preventing relative motion along the z-axis, and accommodating vertical loads. This engagement also retains base 306 of insert 304 in aperture 314 of floor panel 10 without bonding the insert to the floor panel, therefore allowing movement along the x-axis.

Inner collar 312 has an interior surface, some extent of which consists of six flat faces arranged as a hex shape. This shape may engage collet 332 to allow fastener 328 to resist rotation when screw 330 is turned. The non-circular shape of outer collar 310 may also engage aperture 314 to resist the rotation.

At a top end of opening 326, the interior surface flares out to a larger and more circular shape to conform to an underside of the screw's head. The opening may thereby accommodate a full extent of the screw, which may lie flush with a top surface of base 306. Referring to FIG. 11, at a bottom end of opening 326 the interior surface includes a lip 334 extending into opening 326. The lip may prevent collet 332 from passing fully through opening 326, and retain a portion of the collet in base 306.

Inner collar 312 extends out past outer collar 310, but is not of sufficient length to extend out through aperture 314 when base 306 is received in the aperture. Therefore, floor panel 10 may contact and lie flat against seat track 16 when the floor panel is connected to the seat track by connector 302. In other examples, inner collar may be shorter than outer collar 310, or may extend out through aperture 314 to contact seat track 16 and cause a gap between floor panel 10 and the seat track. In such an example, the gap caused may match a gap caused by another connector.

Figure 12:
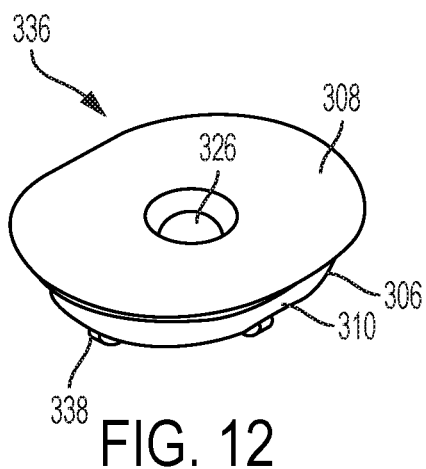
FIG. 12 is an isometric view of another exemplary insert.
Figure 13:
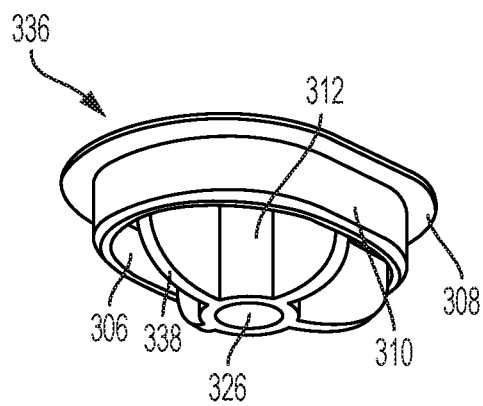
FIG. 13 is an isometric view of the insert of FIG. 12.

FIGS. 12-13 show an alternative embodiment of insert 304, generally indicated at 336. For clarity, parts in common with the previously described embodiment are indicated with the same reference numbers. Insert 336 also includes a base 306, a flange 308, and an opening 326.

Base 306 includes an outer collar 310 and an inner collar 312. Four rounded bridges 338 connect inner collar 312 to outer collar 310. Two of the bridges extend along the width of base 306, while another two bridges extend perpendicular. Bridges 338 stiffen and reinforce the structure of base 306. In other examples, any number of bridges may be used. Other shapes of stiffeners may be disposed at any point to provide structural reinforcement for insert 336.

Inner collar 312 has a smooth circular interior surface, with no protrusions into opening 326. The interior surface flares out to a larger diameter at a top end of opening 326, to accommodate a fastener. Inner collar 312 may also have any shape appropriate to accommodate a fastener and assist in the installation of the fastener, for example by retaining a component or by engaging a component to resist rotation.

Example 4

Figure 14:
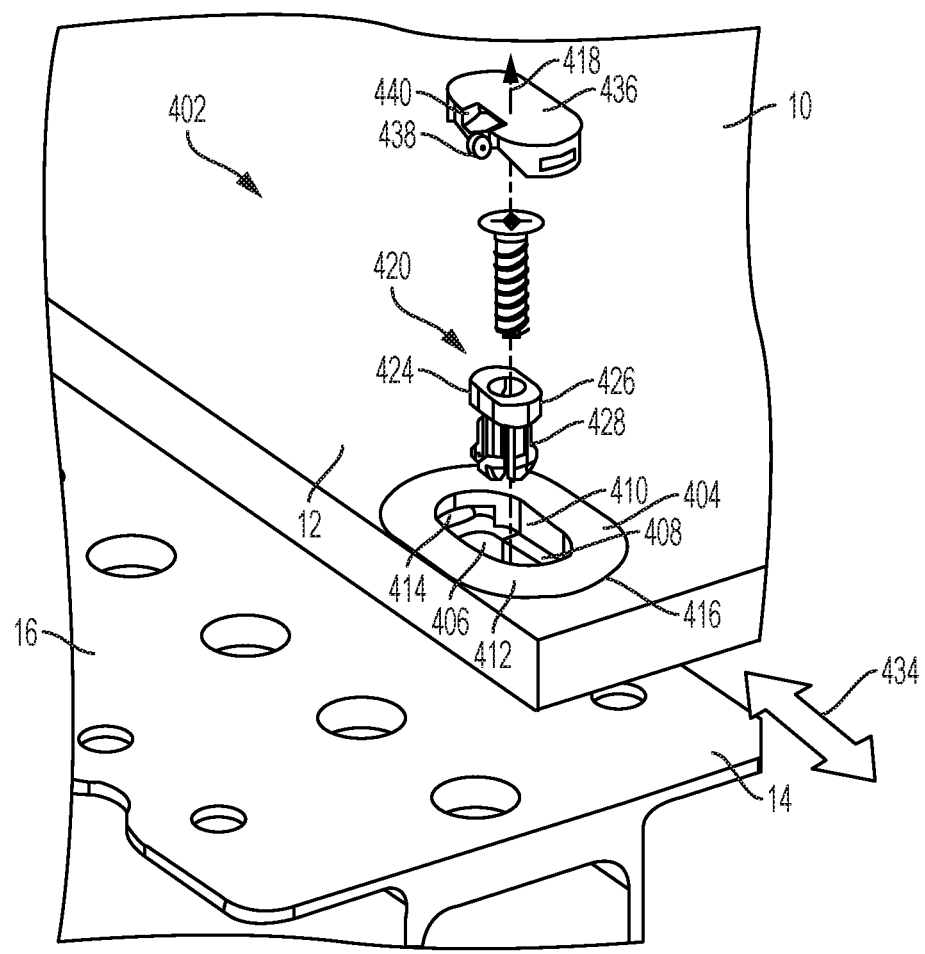
FIG. 14 is a partially exploded isometric view of another exemplary vertical load connector, a floor panel, and a seat track.

FIGS. 14-18 show another example of a vertical load connector generally indicated at 402, including an oblong insert 404 that has an elongate opening 406. FIG. 14 is a partially exploded isometric view of connector 402 connecting floor panel 10 and seat track 16. Connector 402 accommodates loads both perpendicular to the plane of floor panel 10, along the z-axis, and in the plane of floor panel 10, along the y-axis. Connector 402 has float in the plane of floor panel 10, along the x-axis.

Figure 18:
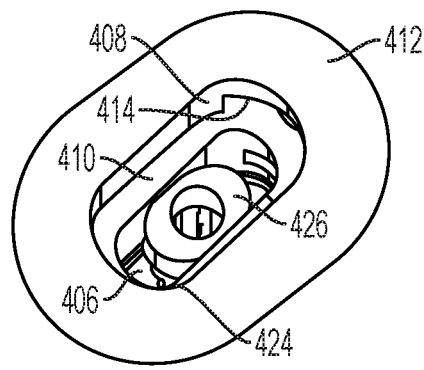
FIG. 18 is an isometric view of the insert and the collet of FIG. 14.

FIG. 18 more clearly shows insert 402, which further includes a body 408 that defines opening 406 and a recess 410 at a top end of opening 406. A flange 412 is formed on body 408 at a top end of the body. Multiple generally rectangular holes 414 open out from recess 410 and passage 406.

As can be seen in FIG. 14, body 408 is sized to be received snugly in an oblong aperture 416 in edge region 12 of floor panel 10, while flange 412 contacts an upper surface of the edge region and lies flat against the floor panel. Aperture 416 defines a vertical axis 418, parallel to the z-axis. Aperture 416 conforms closely to body 408, preventing insert 404 from moving relative to the floor panel in the plane of the floor panel, along either the x- or the y-axis. Flange 412 prevents insert 404 from passing through aperture 416 when body 408 is received by the aperture. Body 408 also does not extend through aperture 416, allowing edge region 12 of floor panel 10 to contact and lie flat against seat track 16.

Opening 406 and recess 410 are configured to receive a fastener 420. In the pictured example, the fastener includes a screw 422 and a collet 424 with an oblong collet body 426 and multiple fingers 428. Any blind fastener may be used, and, in other examples, opening 406 and recess 410 may be otherwise configured to receive and engage the geometry of a chosen fastener.

Figure 15:
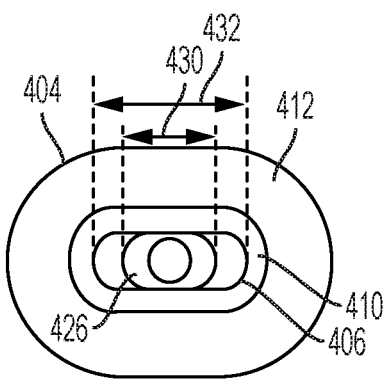
FIG. 15 is a top plan view of the insert and collet of FIG. 14.
Figure 16:
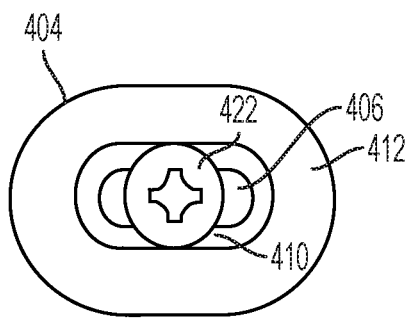
FIG. 16 is a top plan view of the insert and the screw of FIG. 14.

As shown in FIG. 15, collet body 426 is disposed in opening 406, while fingers 428 extend out past insert 404. A head of screw 422 is received in recess 410, as shown in FIG. 16. The screw is entirely below flange 412 and the head of the screw may engage body 408 of insert 404 at a point where recess 410 meets opening 406. The oblong shape of collet body 426 may resist rotation by contacting sides of opening 406, when screw 422 is screwed into collet 424.

A width 430 of collet body 426 and a width 432 of opening 406 are indicated in FIG. 15. Collet body width 430 is less than opening width 432, allowing collet body 426 and therefore fastener 420 to move in two opposed directions relative to insert 404. In perpendicular directions, collet body 424 is sized to conform to opening 406, preventing movement in those directions. In other words, oblong collet body 426 is shaped to slide along elongate opening 406.

When insert 404 is installed in floor panel 10, as shown in FIG. 14, fastener 420 may move a limited distance along the x-axis. That is, connector 402 allows floor panel 10 to move in the directions indicated by arrow 434. The allowed range of motion, or float is determined by the difference between collet body width 430 and opening width 432. For example, in a case where the opening width is about 0.25 inches greater than the collet body width, floor panel 10 may float about 0.125 inches.

Fastener 420 is prevented from moving along the y-axis by contact between collet body 426 and adjacent sides of opening 406, thereby allowing connector 402 to resist loads in the plane of floor panel 10, along the y-axis. Fastener 420 also resists loads in the vertical direction by engaging the head of screw 422 with insert 404 and engaging multiple fingers of collet 424 with an underside of seat track 16. Flange 412 in turn engages floor panel 10, thereby holding the floor panel to the seat track, preventing relative motion along the z-axis, and accommodating vertical loads.

This engagement also retains body 408 of insert 404 in aperture 416 of floor panel 10 without bonding the insert to the floor panel. In other examples, insert 404 may be bonded to floor panel 10, in some cases to allow a combination of the floor panel and the insert to be manipulated as a unit, and in some cases to allow floor panel 10 to be provided with insert 404 previously installed. Other blind fasteners may be used, and may engage insert 404 by other mechanisms, or resist vertical loads by other methods.

Referring again to FIG. 14, connector 402 further includes a cap 436, that snap-fits into insert 404. Generally rectangular protrusions are formed on an exterior surface, configured to snap into holes 414 in recess 410 and retain cap 436 in insert 404. A peg 438 extends across from a bottom edge of the cap to slip into another hole 414, and also retain cap 436 in insert 404. In other examples, cap 436 may be retained by any appropriate mechanism.

Figure 17:
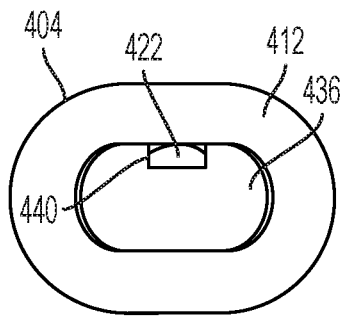
FIG. 17 is a top plan view of the insert, and the cap of FIG. 14.

Cap 436 is sized to fit snugly into recess 410 and lie flush with flange 412, as shown in FIG. 17. Also shown is a tooling cutout 440 in cap 436, to facilitate removal of the cap. For example, a flat-head screwdriver may be inserted between cap 436 and screw 422 and levered to snap the cap out of recess 410.

Figure 19:
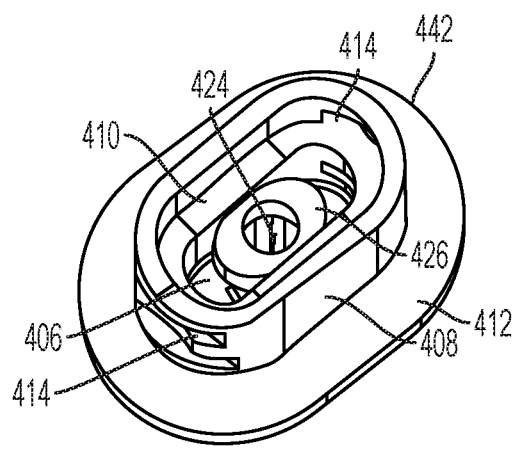
FIG. 19 is an isometric view of an insert and a collet of another exemplary vertical load connector.

FIG. 19 shows an alternative embodiment of insert 404, generally indicated at 442. For clarity, parts in common with the previously described embodiment are indicated with the same reference numbers. Insert 442 also includes a flange 412 and a body 408 defining an elongate opening 406 and a recess 410.

Flange 412 is formed on body 408 at a bottom end of the body. When body 408 is received in floor panel aperture 416, flange 412 contacts a bottom surface of floor panel 10. The flange is bonded to the bottom surface of the floor panel, allowing a combination of insert 442 and floor panel 10 to be manipulated as a unit.

Flange 412 also contacts and lays flat against seat track 16, and is disposed between edge region 12 of floor panel 10 and the seat track. The flange therefore causes a gap between the floor panel and the seat track. In some examples, the gap may match a gap caused by another connector.

Example 5

Figure 21:
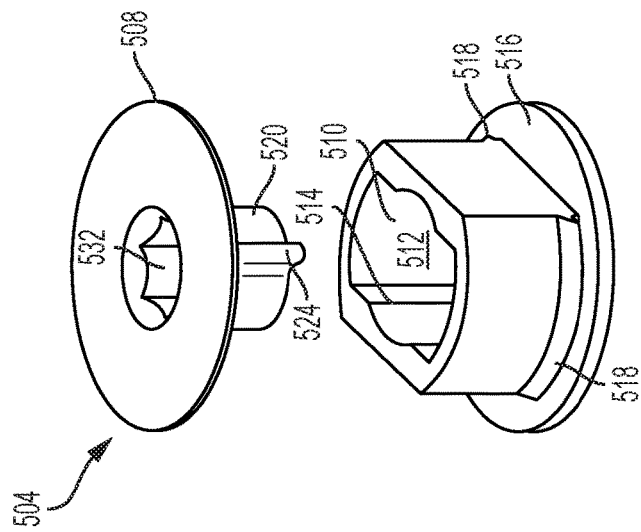
FIG. 21 is an exploded isometric view of the insert of FIG. 20.
Figure 22:
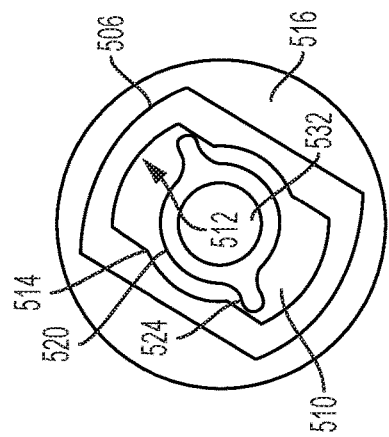
FIG. 22 is a diagrammatic representation of a top plan view of the insert of FIG. 20, shown without a flange.
Figure 20:
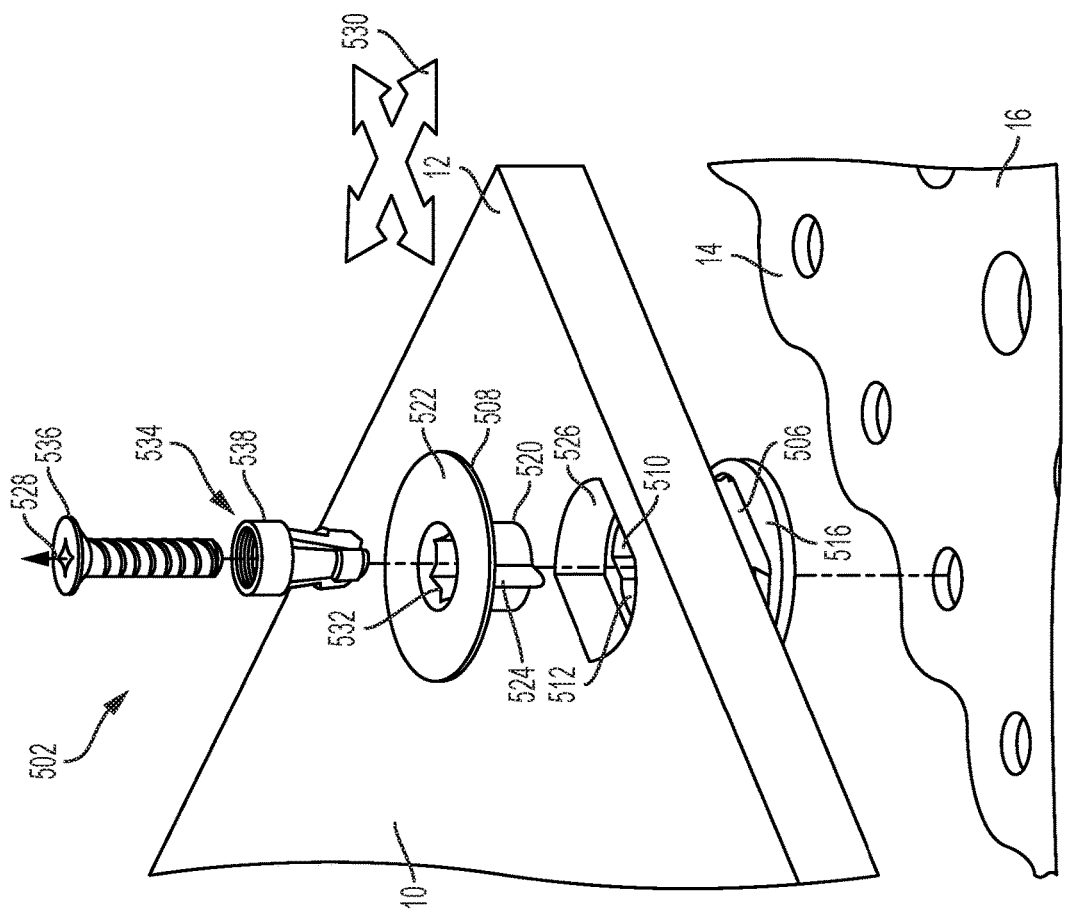
FIG. 20 is an exploded isometric view of another vertical load connector, a floor panel, and a seat track.

FIGS. 20-22 show another example of a vertical load connector 502 including an insert 504 that has a base 506 and a sleeve connector 508. FIG. 20 is an exploded isometric view of connector 502 connecting floor panel 10 and seat track 16. Connector 502 accommodates loads perpendicular to the plane of floor panel 10, along the z-axis, and has float in the plane of the floor panel, along both the x and y axes.

As shown in FIG. 21, base 506 is generally rectangular in shape, with two flat sides and two rounded sides. A recess 510 extends through the base, matching the outer shape of base 506, with the addition of a central circular area. Base 506 has an inner surface 512 that defines recess 510, and includes four corners 514. A circular flange 516 is formed on base 506 at a bottom end of recess 510, and two triangular protrusions 518 extend from base 506 proximate the flange along the two rounded sides.

Sleeve 508 includes a collar 520 configured to be received in recess 510 and a circular flange 522 formed at a top end of the collar. Two paddles 524 extend radially outward from collar 520, along the length of the collar.

FIG. 22 is a diagrammatic representation of a top plan view of collar 520 received in base 506, flange 522 not shown. Sleeve 508 and base 506 are not directly connected and may not contact one another. Recess 510 accommodates collar 520 and paddles 524 with room to spare, allowing sleeve 508 to move in any direction relative to base 506, and rotate a limited amount about vertical axis 528. Past the limited range of rotation, paddles 524 engage corners 514 of inner surface 512 to prevent further rotation.

In other examples, any effective geometry of collar 520, paddles 524, and recess 510 may be used. For example, recess 510 may be rectangular with two projections extending from inner surface 512. Collar 520 may be square, with a peg extending from each side to interact with the two projections.

Referring again to FIG. 20, base 506 is sized to be received snugly in a non-circular aperture 526 in edge region 12 of floor panel 10, as shown in FIG. 20. Aperture 526 defines a vertical axis 528, parallel to the z-axis. Sloped surfaces of triangular protrusions 518 engage edges of aperture 526 to allow base 506 to snap-fit into the aperture. Once installed, triangular protrusions 518 deform the interior surface of aperture 526 and retain the base in the aperture, allowing floor panel 10 and base 506 to be manipulated as a unit. Base 506 may be snap-fit into floor panel 10 at the time of floor installation, or floor panel 10 may be provided with base 506 previously installed. Base 506 may include any appropriate snap-fit features. In some examples, base 506 may instead be retained by bonding flange 516 to a bottom surface of floor panel 10.

When insert 504 is installed in the floor panel, base 506 is received in aperture 526 of floor panel 10, and collar 520 of sleeve 508 is received in recess 510 of the base. Flange 522 contacts an upper surface of floor panel 10, and flange 516 contacts the bottom surface of the floor panel. In the pictured example, the flanges are circular, but any shape of flange providing sufficient surface area of contact with floor panel 10 may be used.

Sleeve 508 may move relative to base 506 in the plane of floor panel 10. That is, insert 504 allows the floor panel to move in the four directions indicated by arrow 530, along the x and they axes. The allowed range of motion or float is determined roughly by the difference between an extent of collar 520 and paddles 524, and an extent of recess 510 in any direction. For example, in a case where the radius of collar 520 is about 0.25 inches less than the radius of the central circular area of recess 510, floor panel 10 may float about 0.125 inches along the y-axis.

Collar 520 defines an opening 532 sized to receive a fastener 534. In the example pictured in FIG. 20, the fastener includes a screw 536 and a collet 538. Fastener 534 resists loads in the vertical direction by engaging a head of screw 536 with sleeve 508 and engaging multiple fingers of collet 538 with an underside of seat track 16. Flange 522 in turn engages floor panel 10, thereby holding the floor panel to the seat track, preventing relative motion along the z-axis, and accommodating vertical loads. This engagement also retains sleeve 508 of insert 504 in aperture 526 of floor panel 10 without bonding the sleeve to the floor panel, thereby allowing movement in the plane of the floor panel.

Collar 520 has an interior surface, some extent of which consists of six flat faces arranged as a hex shape. This shape may engage collet 538 to allow fastener 534 to resist rotation when screw 536 is turned. Paddles 524 may also engage inner surface 512 to resist the rotation.

At a top end of opening 532, the interior surface flares out to a larger and more circular shape to conform to an underside of the screw's head. The opening may thereby accommodate a full extent of the screw, which may lie flush with a top surface of sleeve 508. In some examples at a bottom end of opening 532 the interior surface may include a lip, extending into the opening. The lip may prevent collet 538 from passing fully through opening 532, and retain a portion of the collet in sleeve 508.

Manner of Operation/Use

Figure 23:
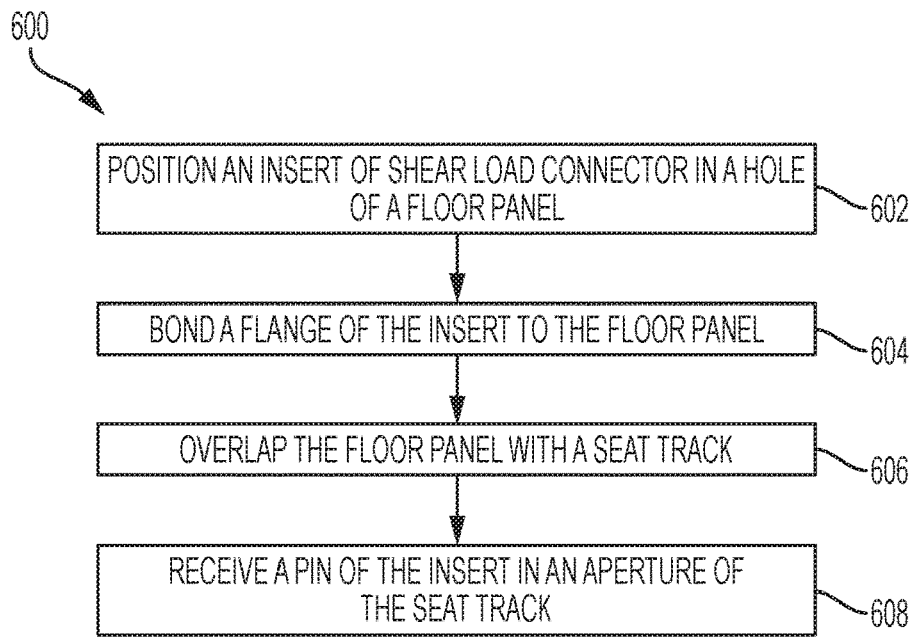
FIG. 23 is a diagrammatic representation of a flow chart illustrating a method for resisting shear loads on a floor panel.

FIG. 23 describes an illustrative method 600 for resisting shear loads on a floor panel. The method may be used in conjunction with any of the shear load connector examples previously described.

First step 602 of method 600 includes positioning an insert of a shear load connector in a hole of a floor panel. The hole may be one of a plurality of holes in an edge region of the floor panel. At step 604, the method includes bonding a flange of the insert to the floor panel. The flange may be bonded to an underside of edge region of the floor panel, to retain the insert in position in the hole.

At step 606, the method includes overlapping the floor panel with a seat track having a lateral edge portion with a plurality of apertures. The hole in the edge region of the floor panel may be aligned with an aperture of the plurality of apertures.

At step 608, the method includes receiving a pin of the insert of the shear load connector in the aperture of the lateral edge portion of the seat track. The step may also be performed for any example of an insert with a protruding element that may be received in an aperture of the seat track.

Figure 24:
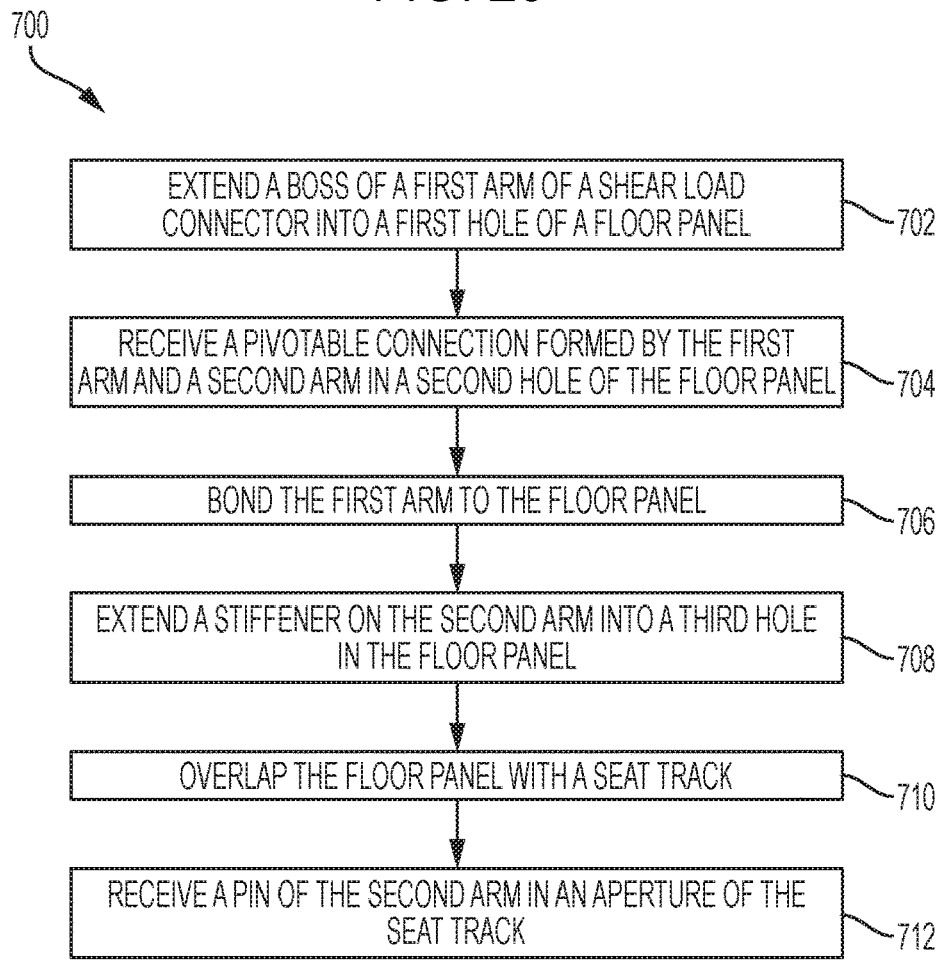
FIG. 24 is a diagrammatic representation of a flow chart illustrating another method for resisting shear loads on a floor panel.

FIG. 24 describes an illustrative method 700 for resisting shear loads on a floor panel. The method may be used in conjunction with any of the shear load connector examples previously described.

First step 702 of method 700 includes positioning a first arm of an insert of a shear load connector such that a boss of the arm extends into a first hole of a plurality of holes in an edge region of the floor panel. The first arm may be pivotably coupled to a second arm of the insert. At step 704, the method includes receiving a pivotable connection formed by the first arm and the second arm in a second hole of the plurality of holes.

Step 706 of the method includes bonding the first arm to the floor panel. The arm may be bonded to a bottom surface of the floor panel, and the second arm may not be bonded. In some examples of a shear load connector, the second arm may include a stiffener. For such examples, optional step 708 includes extending the stiffener into a third hole of the plurality of holes in the floor panel.

At step 710, method 700 includes overlapping the floor panel with a seat track having a lateral edge portion with a plurality of apertures. The first, second, and third holes may not be aligned with any aperture of the plurality of apertures. However, the floor panel may be overlapped such that a pin of the second arm is aligned with an aperture of the plurality of apertures.

Step 712 of the method includes receiving the pin in the aperture of the seat track. The step may also be performed for any protruding element of the second arm that may be received in an aperture of the seat track.

Figure 25:
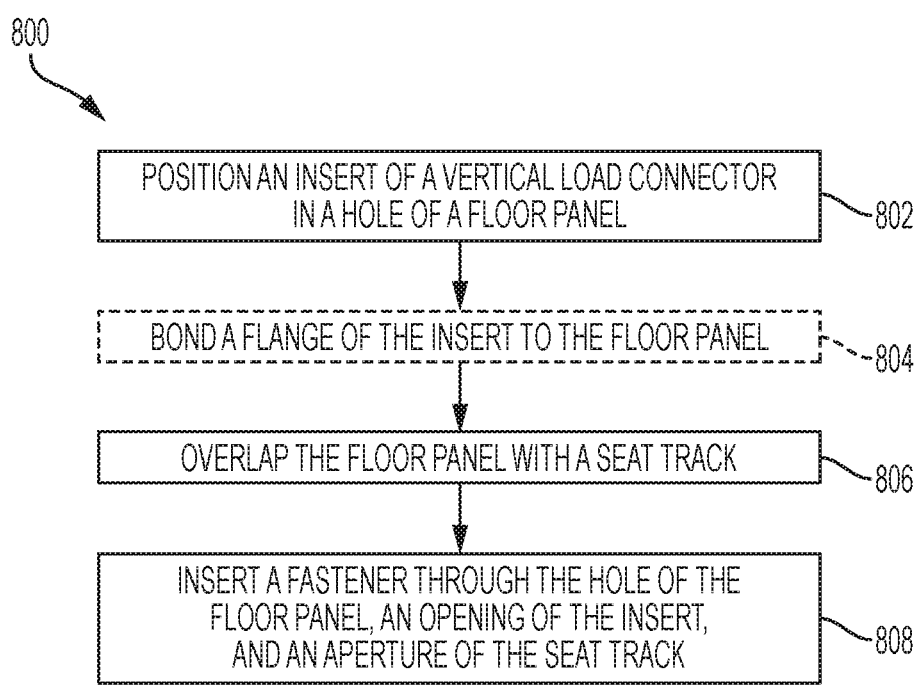
FIG. 25 is a diagrammatic representation of a flow chart illustrating a method for resisting vertical loads on a floor panel.

FIG. 25 describes an illustrative method 800 for resisting vertical loads on a floor panel. The method may be used in conjunction with any of the vertical load connector examples previously described.

First step 802 of method 800 includes positioning an insert of a vertical load connector in a hole of the floor panel. The hole may be non-circular and may be disposed in an edge portion of the floor panel. The insert may include a base and a flange, and positioning the insert may include receiving the base in the hole. In some examples the flange may contact a top side of the edge region of the floor panel. In other examples of a vertical load connector the flange may contact underside of the edge region of the floor panel. Optional step 804 of the method includes bonding the flange of the second insert to the floor panel.

In some examples, the insert may include a base having a first opening and a sleeve having a second opening, the insert being configured to allow a predetermined amount of rotation about a vertical axis of the hole. In such examples, step 802 may include receiving the base in the hole and may further include receiving the sleeve in the first opening.

At step 806, the method includes overlapping the floor panel with a seat track having a lateral edge portion with a plurality of apertures. The hole in the edge region of the floor panel may be aligned with an aperture of the plurality of apertures.

Step 808 of method 800 includes inserting a fastener through the hole of the floor panel, an opening of the insert, and the aperture of the seat track, to attach the floor panel to the seat track. Any appropriate fastener may be used, including previously described examples. For an example of an insert having first and second openings, the fastener may be inserted through both openings.

Although various steps of methods 600, 700 and 800 are described above and depicted in FIGS. 23-25, the steps need not necessarily all be performed, in some cases may be performed in a different order than the order shown, and in some cases may be performed simultaneously. In some examples, a method for resisting loads on a floor panel may include steps from two or more of the described methods. For example, a method may include steps 702-710, and 712 of method 700, and steps 802-808 of method 800. The two methods may be combined and repeated to connect a floor panel to a seat track with multiple shear load connectors and multiple vertical load connectors, to resist both vertical and shear loads.

Additional Examples

This section describes additional aspects and features of examples, presented without limitation as a series of paragraphs, some or all of which may be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A. A floor panel connection system, comprising:

an aircraft airframe having a plurality of apertures along a lateral edge portion;

a floor panel having an edge region configured for overlapping engagement with the lateral edge portion of the airframe, the edge region having a plurality of holes;

a vertical load resisting coupling device connecting the floor panel to the airframe, configured for resisting forces applied to the panel in a direction perpendicular to a top facial plane of the floor panel without significantly resisting lateral forces applied to the floor panel, the vertical load resisting coupling device received in one or more holes of the plurality of holes; and a shear load resisting coupling device connecting the floor panel to the airframe separate from the vertical load resisting coupling device, configured for resisting forces applied to the panel in a direction parallel to the top facial plane of the floor panel without significantly resisting vertical forces applied to the floor panel, the shear load resisting coupling device received in at least one hole of the plurality of holes.

A1. The system of A, wherein the shear load resisting coupling device includes an insert positioned between the lateral edge portion of the airframe and the edge region of the floor panel.

A2. The system of A1, wherein the insert includes a base and a connector, the base is configured to be received in the at least one hole, the base includes an opening sized to (1) receive the connector and (2) prevent the connector from moving in first and second opposed directions that are parallel to the top facial plane of the floor panel when the connector is received in the opening.

A3. The system of A2, wherein the opening of the base is further sized to allow the connector to move in third and fourth opposed directions that are parallel to the top facial plane of the floor panel and that are perpendicular to the first and second directions when the connector is received in the opening.

A4. The system of A2, wherein the connector includes a head and a protruding element, the head is received in the opening and the protruding element extends into an aperture of the plurality of apertures of the lateral edge portion of the airframe when the lateral edge portion and the edge region are in overlapping engagement.

A5. The system of A4, wherein the connector does not include an opening.

A6. The system of A4, wherein the connector includes a nominal position, and wherein the insert further includes at least one bias element configured to urge the connector toward the nominal position when the connector is moved away from the nominal position.

A7. The system of A6, wherein the aperture includes a vertical axis and the protruding element is within the vertical axis in the nominal position when the lateral edge portion and the edge region are in overlapping engagement.

A8. The system of A6, wherein the at least one bias element includes first and second coiled springs attached to the base and the connector, and the connector is disposed between the first and second coiled springs.

A9. The system of A1, wherein the at least one hole includes a first hole having a first vertical axis, wherein the insert includes first and second arms that are configured to prevent movement in first and second opposed directions that are parallel to the top facial plane of the floor panel when the insert is positioned between the lateral edge portion and the edge region.

A10. The system of A9, wherein the first arm is pivotably coupled to a second arm to allow the second arm to pivot relative to the first arm about a second vertical axis that is parallel to the first vertical axis to allow movement of the second arm relative to the first arm in third and fourth opposed directions that are parallel to the top facial plane of the floor panel and that are perpendicular to the first and second directions.

A11. The system of A10, wherein the first arm includes a first protruding element that extends into the first hole, and the second arm includes a second protruding element that extends into an aperture of the plurality of apertures of the lateral edge portion of the airframe.

A12. The system of A11, where a gap having a first height is formed between the edge region and the lateral edge portion when the vertical load resisting coupling device connects the floor panel to the airframe, wherein the first and second arms have a second height between the edge region and the lateral edge portion when the first protruding element extends into the first hole and the second protruding element extends into the aperture of the plurality of apertures of the lateral edge portion, the second height is equal to the first height.

A13. The system of A12, wherein the second arm includes a nominal position, wherein the insert further comprises a bias element configured to urge the second arm toward the nominal position when the second arm is moved away from the nominal position.

A14. The system of A13, wherein, in the nominal position, the second protruding element extends into the aperture when the first protruding element extends into the first hole and when the lateral edge portion and the edge region are in overlapping engagement.

A15. The system of A13, wherein the bias element includes a spring clip.

A16. The system of A11, wherein the first arm is bonded to an underside of the edge region of the floor panel.

A17. The system of A16, wherein the second arm is not bonded to the edge region of the floor panel.

A18. The system of A11, wherein the first arm includes a first coupler and the second arm includes a second coupler, the first and second couplers are connected to form a pivotable connection between the first and second arms.

A19. The system of A18, wherein the at least one hole includes a second hole, and the pivotable connection is received in the second hole when the first protruding element extends into the first hole.

A20 The system of A19, wherein the second arm includes a nominal position, and the first coupler is configured to urge the second arm toward the nominal position when the second arm is moved away from the nominal position.

A21. The system of A19, wherein the at least one hole includes a third hole, and the second arm further includes a third protruding element opposed from the second protruding element, the third protruding element extends into the third hole when the pivotable connection is received in the second hole and the first protruding element extends into the first hole.

A22. The system of A19, wherein the insert further includes a retaining element configured to maintain the pivotable connection formed by the first and second couplers.

A23. The system of A22, wherein the second arm includes a nominal position, wherein the retaining element is further configured to urge the second arm toward the nominal position when the second arm is moved away from the nominal position.

A24. The system of A23, wherein, in the nominal position, the second protruding element extends into the aperture when the first protruding element extends into the first hole and the pivotable connection is received in the second hole.

A25. The system of A, wherein the one or more holes includes a non-circular hole having a vertical axis, and the vertical load coupling device includes an insert configured to be received in the non-circular hole, the insert having an opening to receive at least one fastener.

A26. The system of A25, wherein the non-circular hole is sized to allow the insert to move in first and second opposed directions that are parallel to the top facial plane of the floor panel, and wherein the non-circular hole is configured to prevent rotation of the insert about the vertical axis when received in the non-circular hole.

A27. The system of A25, wherein the insert includes a base portion and a flange portion, the base portion is received in the non-circular hole and includes the opening, and the flange portion contacts the edge region of the floor panel when the base portion is received in the non-circular hole.

A28. The system of A27, wherein the flange portion contacts a top side of the edge region of the floor panel.

A29. The system of A25, wherein the non-circular hole is oblong-shaped.

A30. The system of A25, wherein the opening is elongate to allow the at least one fastener to move in first and second opposed directions that are parallel to the top facial plane of the floor panel when the fastener is received in the elongate opening.

A31. The system of A30, wherein the insert includes a base portion and a flange portion, the base portion is received in the non-circular hole and includes the opening, and the flange portion contacts the edge region of the floor panel when the base portion is received in the non-circular hole.

A32. The system of A31, wherein the flange portion contacts a top side of the edge region of the floor panel.

A33. The system of A31, wherein the flange portion contacts an underside of the edge region of the floor panel.

A34. The system of A25, wherein the insert includes a base and a connector, the base is configured to be received in the non-circular hole and includes a recess, the connector includes the opening and a protruding element that extends into the recess.

A35. The system of A34, wherein the base includes a flange portion that contacts an underside of the edge region of the floor panel.

A36. The system of A35, wherein the flange portion is not bonded to the underside of the edge region of the floor panel.

A37. The system of A34, wherein the recess is configured to allow the connector, when received in the recess, to (1) move in a direction that is parallel to the top facial plane of the floor panel and (2) rotate only a predetermined amount about the vertical axis.

A38. The system of A37, wherein the recess is elongate and the protruding element includes at least one paddle configured to contact an inner surface when the connector is rotated the predetermined amount about the vertical axis, the inner surface at least partially defining the recess of the base.

A39. The system of A34, wherein the base is configured to snap fit into the non-circular hole.

A40. The system of A, wherein the shear load resisting coupling device can resist a 9G force.

A41. The system of A, wherein the airframe is a seat track.

B. A floor panel assembly for an aircraft, comprising:

a planar expanse having a top face, a bottom face, an edge region, and a hole in the edge region; and an insert having a base and a connector, the base is configured to be received in the hole, the base includes an opening sized to (1) receive the connector and (2) resist movement of the connector in first and second opposed directions that are parallel to the top facial plane of the floor panel when the connector is received in the opening, wherein the connector includes a protruding element that extends into an aperture of a lateral edge portion of an airframe when the edge region is in overlapping engagement with the lateral edge portion of the airframe.

B1. The assembly of B, wherein the opening is further sized to allow movement of the connector in third and fourth opposed directions that are parallel to the top facial plane of the floor panel and that are perpendicular to the first and second directions when the connector is received in the opening.

B2. The assembly of B, where the hole includes a vertical axis, and wherein the insert further includes at least one bias element configured to urge the connector toward the vertical axis when the connector is moved away from the vertical axis.

C. A floor panel assembly for an aircraft, comprising:

a planar expanse having a top face, a bottom face, an edge region, and a first hole in the edge region, the first hole having a first vertical axis; and a swing arm having first and second arms, the first arm is pivotably coupled to a second arm to allow the second arm to pivot relative to the first arm about a second vertical axis that is parallel to the first vertical axis, wherein the first arm includes a first protruding element that extends into the first hole, and the second arm includes a second protruding element that extends into an aperture of a lateral edge portion of an airframe when the edge region is in overlapping engagement with the lateral edge portion of the airframe.

C1. The assembly of C, wherein the swing arm further comprises a bias element configured to center the second arm about the second vertical axis such that the second protruding element extends into the aperture when (1) the edge region is in overlapping engagement with the lateral edge portion of the airframe and (2) the first protruding element extends into the first hole.

C2. The assembly of C, wherein the first arm is bonded to an underside of the edge region of the floor panel, and the second arm is not bonded to the edge region of the floor panel.

C3. The assembly of C, wherein the edge region of the floor panel includes a second hole, the first arm includes a first coupler and the second arm includes a second coupler, the first and second couplers are connected to form a pivotable connection between the first and second arms, the pivotable connection is received in the second hole when the first protruding element extends into the first hole.

C4. The assembly of C3, wherein the second arm includes a nominal position, and first coupler is configured to urge the second arm toward the nominal position when the second arm is moved away from the nominal position.

C5. The assembly of C3, wherein the edge region of the floor panel includes a third hole, and the second arm further includes a third protruding element opposed from the second protruding element, the third protruding element extends into the third hole when the pivotable connection is received in the second hole and the first protruding element extends into the first hole.

C6. The assembly of C, where a gap having a first height is formed between the edge region and the lateral edge portion when the vertical load resisting coupling device connects the floor panel to the airframe, wherein the first and second arms have a second height between the edge region and the lateral edge portion when the first protruding element extends into the first hole and the second protruding element extends into the aperture of the plurality of apertures of the lateral edge portion, the second height is equal to the first height.

D. A method of resisting shear loads on an aircraft floor panel, comprising:

positioning an insert in a hole of an edge region of a floor panel, the insert includes a base and a connector, the base is configured to be received in the hole, the base includes an opening sized to (1) receive the connector, (2) resist movement of the connector in first and second opposed directions that are parallel to the top facial plane of the floor panel when the connector is received in the opening, and (3) allow movement of the connector in third and fourth opposed directions that are parallel to the top facial plane of the floor panel and that are perpendicular to the first and second directions when the connector is received in the opening; and overlapping an edge region of the floor panel with a lateral edge portion of an airframe such that a protruding element of the connector is received into an aperture of the lateral edge portion.

D1. The method of D, further comprising coupling the edge region of the floor panel to the lateral edge portion of the airframe with a vertical load resisting coupling device.

E. A method of resisting shear loads on an aircraft floor panel, comprising:

positioning a swing arm with a first arm pivotably coupled to a second arm such that a first protruding element of the first arm extends into a first hole of an edge region of a floor panel; and overlapping an edge region of the floor panel with a lateral edge portion of an airframe such that a second protruding element of the second arm is received into an aperture of the lateral edge portion.

E1. The method of E, wherein positioning the swing arm includes bonding the first arm to a bottom face of the floor panel.

E2. The method of E1, wherein bonding the first arm to a bottom face of the floor panel includes not bonding the second arm to the bottom face.

E3. The method of E, wherein positioning the swing arm includes inserting, in a second hole of the edge region of a floor panel, a pivotable connection formed by a first coupler of the first arm and a second coupler of the second arm.

E4. The method of E3, wherein positioning the swing arm includes inserting a third protruding element of the second arm in a third hole of the edge region of the floor panel.

E5. The method of E, further comprising coupling the edge region of the floor panel to the lateral edge portion of the airframe with a vertical load resisting coupling device.

F. A floor panel assembly for an aircraft, comprising:

a planar expanse having a top face, a bottom face, an edge region, and a non-circular hole in the edge region, the non-circular hole having a vertical axis; and an insert having a base portion and a flange portion, the base portion includes an opening to receive at least one fastener, the base portion is configured to be received in the non-circular hole, and the flange portion contacts the edge region of the floor panel when the base portion is received in the non-circular hole, wherein one of the base portion and the opening is configured to allow movement of the floor panel relative to the airframe in first and second opposed directions that are parallel to a top facial plane of the floor panel when the edge region of the floor panel is in overlapping engagement with a lateral edge portion of an airframe.

F1. The assembly of F, wherein the base portion is sized to allow the base portion to move in the first and second opposed directions when received in the non-circular hole, and wherein the base portion is configured to prevent rotation of the base portion about the vertical axis when received in the non-circular hole.

F2. The assembly of F, wherein the opening is elongate to allow the at least one fastener to move in the first and second opposed directions when received in the elongate opening.

F3. The assembly of F, wherein the flange portion contacts the top face of the floor panel.

F4. The assembly of F, wherein the flange portion contacts the bottom face of the floor panel.

F5. The assembly of F4, wherein the flange portion is bonded to the bottom face of the floor panel.

F6. The assembly of F, further comprising a connector having an opening to receive the at least one fastener, the base portion further includes a recess configured to receive the connector and to allow the connector, when received in the recess, to (1) move in a direction that is parallel to the top facial plane of the floor panel and (2) rotate only a predetermined amount about the vertical axis.

F7. The assembly of F6, wherein the flange portion contacts the bottom face of the floor panel but is not bonded to the bottom face.

G. A method of resisting vertical loads on an aircraft floor panel, comprising:
 positioning an insert in a non-circular hole of an edge region of the floor panel, the insert having a first opening to receive at least one fastener, the opening having a vertical axis;
 overlapping an edge region of the floor panel with a lateral edge portion of an airframe such that the first opening is aligned with an aperture of the lateral edge portion; and
 inserting a fastener through the first opening and the aperture to attach the floor panel to the airframe, the insert being configured to allow movement of the floor panel relative to the airframe in first and second opposed directions that are parallel to a top facial plane of the floor panel.

G1. The method of G, where the insert includes a base portion and a flange portion, wherein positioning an insert includes positioning the insert such that the base portion is received in the non-circular hole and the flange portion contacts a top side of the edge region of the floor panel.

G2. The method of G, where the insert includes a base portion and a flange portion, wherein positioning an insert includes positioning the insert such that the base portion is received in the non-circular hole and the flange portion contacts an underside of the edge region of the floor panel.

G3. The method of G2, wherein positioning the insert includes bonding the flange portion to the underside of the edge region of the floor panel.

G4. The method of G, where the insert includes a base portion having the first opening and a flange portion, further comprising positioning a connector within a recess of the base portion, the connector having a second opening configured to receive the at least one fastener and align with the first opening when received in the recess, one of the connector and the recess being configured to further allow only a predetermined amount of rotation about the vertical axis.

G5. The method of G4, wherein inserting a fastener includes inserting a fastener through the first and second openings to attach the floor panel to the airframe.

H. A floor panel connection system, comprising:
 an aircraft airframe having a plurality of apertures along a lateral edge portion;
 a floor panel having an edge region configured for overlapping engagement with the lateral edge portion of the airframe; and
 a vertical load resisting coupling device connecting the floor panel to the airframe, the vertical load resisting coupling device is configured to (1) prevent movement of the floor panel relative to the airframe when forces applied to the panel are in a direction perpendicular to a top facial plane of the floor panel, and (2) allow movement of the floor panel relative to the air frame when lateral forces are applied to the floor panel.

I. A floor panel connection system, comprising:
 an aircraft airframe having a plurality of apertures along a lateral edge portion;
 a floor panel having an edge region configured for overlapping engagement with the lateral edge portion of the airframe; and
 a shear load resisting coupling device connecting the floor panel to the airframe separate from the vertical load resisting coupling device, the shear load resisting coupling device is configured to (a) prevent movement of the floor panel relative to the airframe when forces are applied to the panel in a direction parallel to the top facial plane of the floor panel and (b) allow movement of the floor panel relative to the airframe when vertical forces are applied to the floor panel.

Advantages, Features, Benefits

The different embodiments of the floor panel connection system described herein provide several advantages over known solutions for connecting floor panels to aircraft airframes. For example, the illustrative embodiments of shear load resisting coupling devices and vertical load resisting coupling devices described herein allow a limited range of motion in chosen directions while accommodating loads in other directions. Additionally, and among other benefits, illustrative embodiments of the floor panel connection system described herein reduce the total number of coupling devices needed to accommodate loads on floor. No known system or device can perform these functions, particularly in airplane assembly. Thus, the illustrative embodiments described herein are particularly useful for reducing airplane construction cost. However, not all embodiments described herein provide the same advantages or the same degree of advantage.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed invention. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

We claim:

1. A floor panel connection system, comprising:
an aircraft seat track having a plurality of apertures along a lateral edge portion;
a floor panel having an edge region configured for overlapping engagement with the lateral edge portion of the seat track, the edge region having a plurality of holes;
a vertical load resisting coupling device connecting the floor panel to the seat track, configured for resisting forces applied to the panel in a direction perpendicular to a top facial plane of the floor panel without significantly resisting lateral forces applied to the floor panel, the vertical load resisting coupling device received in one or more holes of the plurality of holes; and
a shear load resisting coupling device connecting the floor panel to the seat track separate from the vertical load resisting coupling device, configured for resisting forces applied to the panel in a direction parallel to the top facial plane of the floor panel without significantly resisting vertical forces applied to the floor panel, the shear load resisting coupling device received in at least one hole of the plurality of holes.

2. The system of claim 1, wherein the shear load resisting coupling device includes an insert positioned between the lateral edge portion of the seat track and the edge region of the floor panel, and the insert includes a base and a connector, the base is configured to be received in the at least one hole, the base includes an opening sized to (1) receive the connector and (2) prevent the connector from moving in first and second opposed directions that are parallel to the top facial plane of the floor panel when the connector is received in the opening.

3. The system of claim 2, wherein the connector includes a head and a protruding element, the head is received in the opening and the protruding element extends into an aperture of the plurality of apertures of the lateral edge portion of the seat track when the lateral edge portion and the edge region are in overlapping engagement.

4. The system of claim 3, wherein the opening of the base is further sized to allow the connector to move in third and fourth opposed directions that are parallel to the top facial plane of the floor panel and that are perpendicular to the first and second directions when the connector is received in the opening.

5. The system of claim 1, wherein the shear load resisting coupling device includes an insert positioned between the lateral edge portion of the seat track and the edge region of the floor panel, and wherein the at least one hole includes a first hole having a first vertical axis, wherein the insert includes first and second arms that are configured to prevent movement in first and second opposed directions that are parallel to the top facial plane of the floor panel when the insert is positioned between the lateral edge portion and the edge region.

6. The system of claim 5, wherein the first arm is pivotably coupled to a second arm to allow the second arm to pivot relative to the first arm about a second vertical axis that is parallel to the first vertical axis to allow movement of the second arm relative to the first arm in third and fourth opposed directions that are parallel to the top facial plane of the floor panel and that are perpendicular to the first and second directions.

7. The system of claim 6, wherein the first arm includes a first protruding element that extends into the first hole, and the second arm includes a second protruding element that extends into an aperture of the plurality of apertures of the lateral edge portion of the seat track.

8. The system of claim 7, where a gap having a first height is formed between the edge region and the lateral edge portion when the vertical load resisting coupling device connects the floor panel to the seat track, wherein the first and second arms have a second height between the edge region and the lateral edge portion when the first protruding element extends into the first hole and the second protruding element extends into the aperture of the plurality of apertures of the lateral edge portion, the second height is equal to the first height.

9. The system of claim 7, wherein the first arm includes a first coupler and the second arm includes a second coupler, the first and second couplers are connected to form a pivotable connection between the first and second arms, and wherein the at least one hole includes a second hole, and the pivotable connection is received in the second hole when the first protruding element extends into the first hole.

10. The system of claim 9, wherein the at least one hole includes a third hole, and the second arm further includes a third protruding element opposed from the second protruding element, the third protruding element extends into the third hole when the pivotable connection is received in the second hole and the first protruding element extends into the first hole.

11. The system of claim 7, wherein the first arm is bonded to an underside of the edge region of the floor panel, and the second arm is not bonded to the edge region of the floor panel.

12. The system of claim 1, wherein the one or more holes includes a non-circular hole having a vertical axis, and the vertical load resisting coupling device includes an insert configured to be received in the non-circular hole, the insert having an opening to receive at least one fastener.

13. The system of claim 12, wherein the non-circular hole is sized to allow the insert to move in first and second opposed directions that are parallel to the top facial plane of the floor panel, and wherein the non-circular hole is configured to prevent rotation of the insert about the vertical axis when received in the non-circular hole.

14. The system of claim 12, wherein the insert includes a base portion and a flange portion, the base portion is received in the non-circular hole and includes the opening, and the flange portion contacts the edge region of the floor panel when the base portion is received in the non-circular hole.

15. The system of claim 12, wherein the opening is elongate to allow the at least one fastener to move in first and second opposed directions that are parallel to the top facial plane of the floor panel when the fastener is received in the elongate opening.

16. The system of claim 12, wherein the insert includes a base and a connector, the base is configured to be received in the non-circular hole and includes a recess, the connector includes the opening and a protruding element that extends into the recess.

17. The system of claim 16, wherein the recess is configured to allow the connector, when received in the recess, to (1) move in a direction that is parallel to the top facial plane of the floor panel and (2) rotate only a predetermined amount about the vertical axis.

18. The system of claim 17, wherein the recess is elongate and the protruding element includes at least one paddle configured to contact an inner surface when the connector is rotated the predetermined amount about the vertical axis, the inner surface at least partially defining the recess of the base.

19. A floor panel connection system, comprising:
  a floor support structure extending longitudinally through an aircraft, and having a plurality of apertures along a lateral edge portion;
  a floor panel having an edge region configured for vertically overlapping engagement with the lateral edge portion of the floor support structure; and
  a vertical load resisting coupling device connecting the floor panel to the floor support structure, wherein the vertical load resisting coupling device is configured to (1) prevent movement of the floor panel relative to the floor support structure when forces applied to the panel are in a direction perpendicular to a top facial plane of the floor panel, and (2) allow movement of the floor panel relative to the floor support structure when lateral forces are applied to the floor panel.

20. A floor panel connection system, comprising:
  a floor support structure extending longitudinally through an aircraft, and having a plurality of apertures along a lateral edge portion;
  a floor panel having an edge region configured for vertically overlapping engagement with the lateral edge portion of the floor support structure; and
  a shear load resisting coupling device connecting the floor panel to the floor support structure, wherein the shear load resisting coupling device is configured to (1) prevent movement of the floor panel relative to the floor support structure when forces are applied to the panel in a direction parallel to a top facial plane of the floor panel and (2) allow movement of the floor panel relative to the floor support structure when vertical forces are applied to the floor panel.

* * * * *